US012736104B2

(12) United States Patent
Nguyen et al.

(10) Patent No.: US 12,736,104 B2
(45) Date of Patent: Sep. 15, 2026

(54) SYSTEMS AND METHODS FOR MITIGATING VIBRATIONS

(71) Applicant: 10x Genomics, Inc., Pleasanton, CA (US)

(72) Inventors: Vu Huy Nguyen, Livermore, CA (US); Denis Pristinski, Dublin, CA (US); David Morgan, Castro Valley, CA (US); Evan Dejarnette, San Francisco, CA (US); Tyler Drake, Livermore, CA (US); David Hoffman, Pleasanton, CA (US)

(73) Assignee: 10X GENOMICS, INC., Pleasanton, CA (US)

( * ) Notice: Subject to any disclaimer, the term of this patent is extended or adjusted under 35 U.S.C. 154(b) by 473 days.

(21) Appl. No.: 18/505,635

(22) Filed: Nov. 9, 2023

(65) Prior Publication Data

US 2024/0159292 A1 May 16, 2024

Related U.S. Application Data

(60) Provisional application No. 63/424,417, filed on Nov. 10, 2022.

(51) Int. Cl.
*F16F 15/027* (2006.01)

(52) U.S. Cl.
CPC ........ *F16F 15/027* (2013.01); *F16F 2228/04* (2013.01)

(58) Field of Classification Search
CPC .... F16F 15/002; F16F 15/027; F16F 2228/04; F16F 15/022; F16F 15/02; F16F 15/03; F16F 15/04; F16F 15/005; F16F 9/535; F16F 7/1011; F16F 7/1017; F16F 7/116;
(Continued)

(56) References Cited

U.S. PATENT DOCUMENTS

| | | | |
|---|---|---|---|
| 5,599,675 | A | 2/1997 | Brenner |
| 5,750,341 | A | 5/1998 | Macevicz |
| 6,172,218 | B1 | 1/2001 | Brënner |

(Continued)

FOREIGN PATENT DOCUMENTS

| | | |
|---|---|---|
| WO | WO 2018/026873 | 2/2018 |
| WO | WO 2021/138676 | 7/2021 |
| WO | WO 2021/167526 | 8/2021 |

OTHER PUBLICATIONS

Chen et al., "Spatially Resolved, Highly Multiplexed RNA Profiling in Single Cells", *Science*, 348(6233): aaa6090, 2015.

(Continued)

*Primary Examiner* — Robert A. Siconolfi
*Assistant Examiner* — San M Aung
(74) *Attorney, Agent, or Firm* — Stephen J. Kenny; Nicole A. Bustos-Pomerantz; Foley Hoag LLP

(57) ABSTRACT

Various embodiments of the present disclosure disclose mitigating internal and external vibrational disturbances in opto-fluidic instrument. In various embodiments, the resonance frequency ranges and/or the vibrational frequency ranges of various modules and components of the opto-fluidic instrument may be selected to avoid resonances from occurring in the opto-fluidic instrument, thereby mitigating vibrations from internal and external sources that may distort the imaging of samples in the opto-fluidic instrument.

24 Claims, 23 Drawing Sheets

(58) Field of Classification Search

CPC .......... B60G 17/0157; B60G 2400/102; G03F 7/0825

USPC .......................................................... 188/378

See application file for complete search history.

(56) References Cited

U.S. PATENT DOCUMENTS

| | | | | |
|---|---|---|---|---|
| 6,306,597 | B1 | 10/2001 | Macevicz | |
| 6,969,488 | B2 | 11/2005 | Bridgham et al. | |
| 7,057,026 | B2 | 6/2006 | Barnes et al. | |
| 7,632,641 | B2 | 12/2009 | Dirks et al. | |
| 7,709,198 | B2 | 5/2010 | Luo et al. | |
| 8,551,710 | B2 | 10/2013 | Bernitz et al. | |
| 8,604,182 | B2 | 12/2013 | Luo et al. | |
| 8,658,361 | B2 | 2/2014 | Wu et al. | |
| 8,951,726 | B2 | 2/2015 | Luo et al. | |
| 9,217,178 | B2 | 12/2015 | Fedurco et al. | |
| 10,138,509 | B2 | 11/2018 | Church et al. | |
| 10,179,932 | B2 | 1/2019 | Church et al. | |
| 10,450,599 | B2 | 10/2019 | Pierce et al. | |
| 10,457,980 | B2 | 10/2019 | Cai et al. | |
| 10,494,662 | B2 | 12/2019 | Church et al. | |
| 10,550,429 | B2 | 2/2020 | Harada et al. | |
| 2005/0100900 | A1 | 5/2005 | Kawashima et al. | |
| 2005/0224687 | A1 * | 10/2005 | Heertjes | F16F 15/02 248/638 |
| 2006/0188901 | A1 | 8/2006 | Barnes et al. | |
| 2006/0240439 | A1 | 10/2006 | Smith et al. | |
| 2006/0281109 | A1 | 12/2006 | Ost et al. | |
| 2007/0166705 | A1 | 7/2007 | Milton et al. | |
| 2009/0118128 | A1 | 5/2009 | Liu et al. | |
| 2009/0180092 | A1 * | 7/2009 | Butler | G03F 7/709 355/72 |
| 2010/0089712 | A1 * | 4/2010 | Butler | G03F 7/709 355/53 |
| 2011/0059865 | A1 | 3/2011 | Smith et al. | |
| 2012/0270305 | A1 | 10/2012 | Reed et al. | |
| 2013/0079232 | A1 | 3/2013 | Kain et al. | |
| 2013/0240705 | A1 * | 9/2013 | Asano | F16F 15/04 248/550 |
| 2013/0260372 | A1 | 10/2013 | Buermann et al. | |
| 2013/0328253 | A1 * | 12/2013 | Kraner | F16F 15/022 267/140.14 |
| 2014/0209779 | A1 * | 7/2014 | Kropp | F16F 15/022 248/550 |
| 2016/0024555 | A1 | 1/2016 | Church et al. | |
| 2016/0091047 | A1 * | 3/2016 | Kramer | F16F 7/1011 267/140.14 |
| 2016/0108458 | A1 | 4/2016 | Frei et al. | |
| 2016/0369329 | A1 | 12/2016 | Cai et al. | |
| 2017/0009278 | A1 | 1/2017 | Söderberg et al. | |
| 2017/0220733 | A1 | 8/2017 | Zhuang et al. | |
| 2019/0055594 | A1 | 2/2019 | Samusik et al. | |
| 2019/0106733 | A1 | 4/2019 | Kishi et al. | |
| 2019/0161796 | A1 | 5/2019 | Hauling et al. | |
| 2019/0177800 | A1 | 6/2019 | Boutet et al. | |
| 2019/0194709 | A1 | 6/2019 | Church et al. | |
| 2019/0367969 | A1 | 12/2019 | Belhocine et al. | |
| 2020/0224243 | A1 | 7/2020 | Desai et al. | |
| 2020/0224244 | A1 | 7/2020 | Nilsson et al. | |
| 2020/0370619 | A1 * | 11/2020 | Doyle | F16F 9/532 |
| 2021/0164039 | A1 | 6/2021 | Wang et al. | |
| 2021/0340618 | A1 | 11/2021 | Kühnemund et al. | |
| 2022/0010358 | A1 | 1/2022 | Kühnemund et al. | |
| 2022/0064697 | A1 | 3/2022 | Zhuang et al. | |

OTHER PUBLICATIONS

Choi et al., "Third-Generation In Situ Hybridization Chain Reaction: Multiplexed, Quantitative, Sensitive, Versatile, Robust", *Development*, 145(12): dev165753, 2018.

Eng et al., "Transcriptome-Scale Super-Resolved Imaging in Tissues by RNA SeqFISH+", *Nature*, 568(7751): 235-239, 2019.

Frei et al., "Highly Multiplexed Simultaneous Detection of RNAs and Proteins in Single Cells", *Nat Methods*, 13(3): 269-275, 2016.

Goh et al., "Highly Specific Multiplexed RNA Imaging in Tissues With Split-FISH", *Nat Methods*, 17(7): 689-693, 2020.

Gyllborg et al., "Hybridization-Based In Situ Sequencing (HybISS) for Spatially Resolved Transcriptomics in Human and Mouse Brain Tissue", *Nucleic Acid Res*, 48(19): e112, 2020.

Lee et al., "Highly Multiplexed Subcellular RNA Sequencing In Situ", *Science*, 342(6177): 1360-1363, 2014.

Mitra et al., "Fluorescent In Situ Sequencing on Polymerase Colonies", *Anal. Biochem*, 320: 55-65, 2003.

Moffitt et al., "RNA Imaging With Multiplexed Error-Robust Fluorescence In Situ Hybridization (MERFISH)", *Methods of Enzymology*, 572: 1-49, 2016.

Nagendran et al., "Automated Cell-Type Classification In Intact Tissues by Single-Cell Molecular Profiling", *eLife*, 7: e30510, 2018.

Shendure et al., "Accurate Multiplex Polony Sequencing of an Evolved Bacterial Genome", *Science*, 309: 1728-1732, 2005.

Tripathi et al., "Z Probe, An Efficient Tool for Characterizing Long Non-Coding RNA in FFPE Tissues", *Noncoding RNA*, 4(3): 20, 2018.

Wang et al., "Three-Dimensional Intact-Tissue Sequencing of Single-Cell Transcriptional States", *Science*, 361(6499): 5691, 2018.

Wu et al., "RollFISH Achieves Robust Quantification of Single-Molecule RNA Biomarkers in Paraffin-Embedded Tumor Tissue Samples", *Commun Biol*, 1, 209, 2018.

Yang et al., "Single-Cell Phenotyping Within Transparent Intact Tissue Through Whole-Body Clearing", *Cell*, 158(4): 945-958, 2014.

* cited by examiner

SYSTEMS AND METHODS FOR MITIGATING VIBRATIONS

CROSS REFERENCE TO RELATED APPLICATION

This application claims priority to U.S. provisional patent application Ser. No. 63/424,417 filed Nov. 10, 2022, the entire content of which is incorporated herein by reference and relied upon.

FIELDS OF THE DISCLOSURE

The present disclosure is directed to systems and methods for vibration mitigation in an instrument. In particular, the present disclosure describes methods and systems for passively isolating an instrument having integrated optics and fluidics modules (e.g., an in situ analysis system) from internal and external vibrational disturbances.

SUMMARY

Some embodiments of the present disclosure describe a system comprising a cooling system, an optics module, and a chassis. In various embodiments, the cooling system is configured to vibrate at one or more frequencies within a vibrational frequency range (VFR) when the system is in operation. Further, the optics module includes an optical frame that has a camera, an illumination module, and an X-Y stage mounted thereon, the optical frame having a first resonance frequency within a first resonance frequency range (RFR). In addition, the chassis, onto which the cooling system and the optical frame are mounted, is configured to couple to a chassis vibration isolation device (a) configured to isolate the chassis from an external environment and (b) having a second resonance frequency within a second RFR. In various embodiments, for a first frequency range selected from (i) the first RFR, (ii) the second RFR, and (iii) the VFR, that has higher peak frequency than a second frequency range that is different from the first frequency range and is selected from (a) the first RFR, (b) the second RFR, and (c) the VFR, a lower frequency range limit of the first frequency range is greater than a higher frequency range limit of the second frequency range by at least a factor of N>2.

Some embodiments of the present disclosure describe a system for dampening vibrations. In various embodiments, the system comprises a first module configured to vibrate at one or more frequencies within a vibrational frequency range (VFR) when the system is in operation. Further, the system comprises a second module that includes a frame and a stage mounted on the frame, the frame having a first resonance frequency within a first resonance frequency range (RFR). In addition, the system comprises a vibration isolation device having a second resonance frequency within a second RFR. In various embodiments, for a first frequency range selected from (i) the first RFR, (ii) the second RFR, and (iii) the VFR, that has higher peak frequency than a second frequency range that is different from the first frequency range and is selected from (a) the first RFR, (b) the second RFR, and (c) the VFR, a lower frequency range limit of the first frequency range is greater than a higher frequency range limit of the second frequency range by at least a factor of N>2. Further, the factor N is such that the stage experiences a vibrational displacement amplitude that is less than a threshold displacement amplitude when the system is in operation.

BRIEF DESCRIPTION OF THE DRAWINGS

For a more complete understanding of the principles disclosed herein, and the advantages thereof, reference is now made to the following descriptions taken in conjunction with the accompanying drawings, in which.

Figure 1:
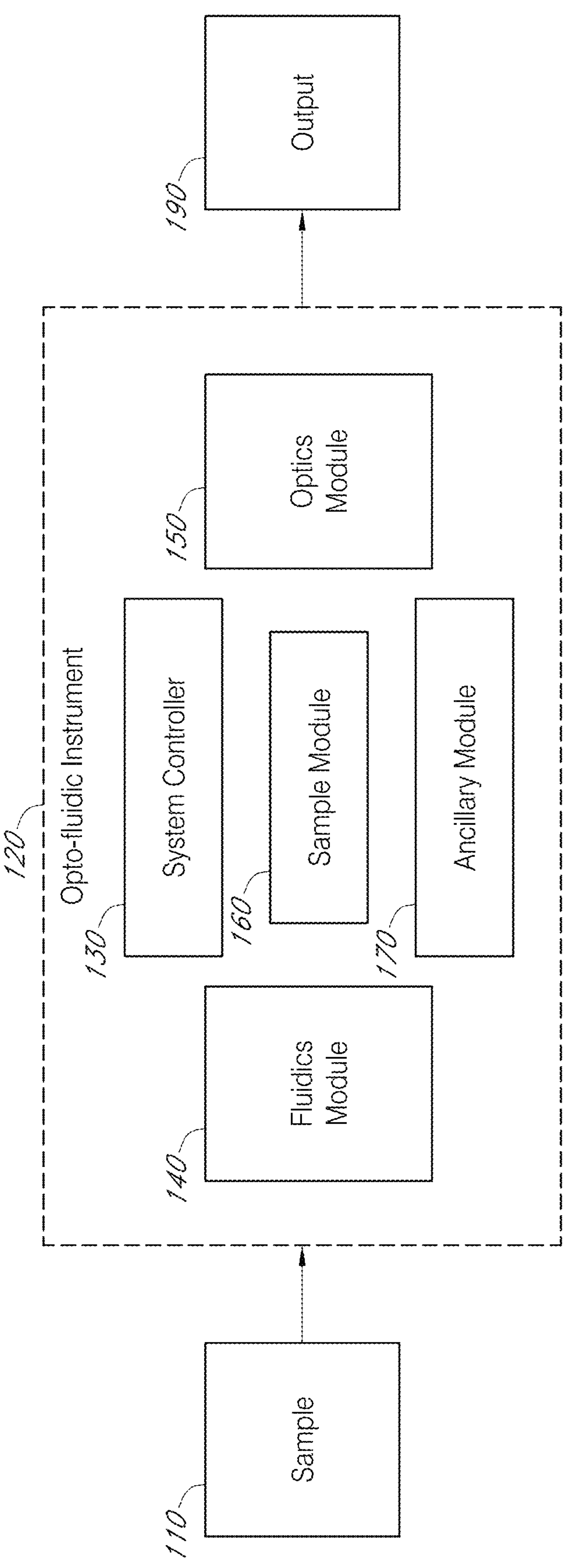
FIG. 1 is an example workflow of analysis of a biological sample (e.g., a cell or tissue sample) using an opto-fluidic instrument, according to various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

I. Overview

Target molecules (e.g., nucleic acids, proteins, antibodies, etc.) can be detected in biological samples (e.g., one or more cells or a tissue sample) using an instrument having integrated optics and fluidics modules (an "opto-fluidic instrument"). In an opto-fluidic instrument, the fluidics module is configured to deliver one or more reagents (e.g., fluorescent probes) to the biological sample and/or remove spent reagents therefrom. Additionally, the optics module is configured to illuminate the biological sample with light having one or more spectral emission curves (over a range of wavelengths) and subsequently capture one or more images of emitted light signals from the biological sample during one or more probing cycles. In various embodiments, the captured images may be processed in real time and/or at a later time to determine the presence of the one or more target molecules in the biological sample, as well as three-dimensional position information associated with each detected target molecule. Additionally, the opto-fluidics instrument includes a sample module configured to receive (and, optionally, secure) one or more biological samples. In some instances, the sample module includes an X-Y stage configured to move the biological sample along an X-Y plane (e.g., perpendicular to an objective lens of the optics module).

In various embodiments, the opto-fluidic instrument is configured to analyze one or more target molecules in their naturally occurring place (i.e., in situ) within the biological sample. For example, an opto-fluidic instrument may be an in situ analysis system used to analyze a biological sample and detect target molecules including but not limited to DNA, RNA, proteins, antibodies, and/or the like.

A sample disclosed herein can be or be derived from any biological sample. Biological samples may be obtained from any suitable source using any of a variety of techniques including, but not limited to, biopsy, surgery, and laser capture microscopy (LCM), and generally includes cells, tissues, and/or other biological material from the subject. A biological sample can be obtained from a prokaryote such as a bacterium, an archaea, a virus, or a viroid. A biological sample can also be obtained from eukaryotic mammalian and eukaryotic non-mammalian organisms (e.g., a plant, a fungus, an insect, an arachnid, a nematoda, a reptile, or an amphibian). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic subjects, subjects that have or are suspected of having a disease (e.g., an individual with a disease such as cancer) or a pre-disposition to a disease, and/or subjects in need of therapy or suspected of needing therapy.

The biological sample can include any number of macromolecules, for example, cellular macromolecules and organelles (e.g., mitochondria and nuclei). The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions.

In some embodiments, the biological sample may comprise cells or a tissue sample which are deposited on a substrate. As described herein, a substrate can be any support that is insoluble in aqueous liquid and allows for positioning of biological samples, analytes, features, and/or reagents on the support. In some embodiments, a biological sample is attached to a substrate. In some embodiments, the substrate is optically transparent to facilitate analysis on the opto-fluidic instruments disclosed herein. For example, in some instances, the substrate is a glass substrate (e.g., a microscopy slide, cover slip, or other glass substrate). Attachment of the biological sample can be irreversible or reversible, depending upon the nature of the sample and subsequent steps in the analytical method. In certain embodiments, the sample can be attached to the substrate reversibly by applying a suitable polymer coating to the substrate and contacting the sample to the polymer coating. The sample can then be detached from the substrate, e.g., using an organic solvent that at least partially dissolves the polymer coating. Hydrogels are examples of polymers that are suitable for this purpose. In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay using the opto-fluidic instruments disclosed herein. Except where indicated otherwise, the preparative or processing steps described below can generally be combined in any manner and in any order to appropriately prepare or process a particular sample for and/or analysis.

For example, a biological sample can be harvested from a subject (e.g., via surgical biopsy, whole subject sectioning) or grown in vitro on a growth substrate or culture dish as a population of cells and prepared for analysis as a tissue slice or tissue section (e.g., a fresh frozen, fixed frozen, or formalin fixed paraffin embedded (FFPE) tissue section). The thickness of a tissue section typically depends on the method used to prepare the section and the physical characteristics of the tissue, and therefore sections having a wide variety of different thicknesses can be prepared and used.

In some instances, the biological sample is fixed in any of a variety of suitable fixatives to preserve the biological structure of the sample prior to analysis. Exemplary fixatives include formalin, formaldehyde, ethanol, methanol, acetone, paraformaldehyde (PFA)-Triton, and combinations thereof.

In some embodiments, a biological sample can be permeabilized to facilitate transfer of analytes out of the sample, and/or to facilitate transfer of species (such as probes or probes sets) into the sample. In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X-100™ or Tween-20™), and enzymes (e.g., trypsin, proteases).

In some embodiments, the biological sample is embedded in a polymer and/or crosslinked matrix (e.g., a hydrogel matrix). Embedding the sample in this manner typically involves contacting the biological sample with a hydrogel such that the biological sample becomes surrounded by the hydrogel. For example, the sample (e.g., a tissue section on a substrate, such as a glass substrate) can be embedded by contacting the sample with a suitable polymer material and activating the polymer material to form a hydrogel. In some embodiments, the hydrogel is formed such that the hydrogel is internalized within the biological sample. In some embodiments, the biological sample (including biological analytes) is immobilized in the hydrogel via cross-linking of the polymer material that forms the hydrogel. Cross-linking can be performed chemically and/or photochemically, or alternatively by any other suitable hydrogel-formation method. In some instances, biological molecules (or derivatives thereof) are cross-linked or otherwise covalently attached to the hydrogel. For example, in some embodiments, nucleic acid molecules (or derivatives thereof, such as an amplification product or probe(s) bound to cellular nucleic acid molecule) in a tissue sample are cross-linked or otherwise covalently attached to the hydrogel.

Hydrogels embedded within biological samples can be cleared using any suitable method. For example, electrophoretic tissue clearing methods or surfactant-based (e.g., sodium dodecyl sulfate (SDS)) clearing methods can be used to remove biological macromolecules from the hydrogel-embedded sample.

Tissue clearing is a process of optically resolving a sample or complex biological material, such as whole organs, large tissue, and cellular models, with minimal changes to morphology and without compromising the ability for immunolabeling or fluorescence imaging detection. In various embodiments, refractive index matching is used for obtaining fluorescence images. Mismatching among mediums can cause loss of imaging resolution, as light may also travel through the sample itself, a mounting media, glass coverslip, oil, and/or a microscope objective. In various embodiments, the amount of variable scattering of light from cellular membranes, lipids, and/or molecules of the specimen is reduced (e.g., minimized) using the various methods described herein. Heterogeneity of scattering among the cellular components may lead to an increase in opaqueness of an image. In various embodiments, a denser makeup of lipids, trafficking organelles, and other subcellular molecules may increase lateral, or non-forward, light scattered. In various embodiments, non-forward light scattering in situ may not pass through the specimen, as it is exacerbated by the continuous, pinball like, interactions of scattered light with neighboring molecules. In various embodiments, through the multiplicity of scattering, refraction, and absorbance the energy of light may be reduced or ultimately lost, leading to a distorted and white, non-translucent image. In various embodiments, a clearing reagent and mountant optically clears the sample by matching the refractive index to minimizing the light scattering through the specimen and to the microscope objective.

In various embodiments, optical clearing may be performed via various different approaches, primarily being divided into chemical and matrix-based approaches. In various embodiments, chemical approaches include aqueous-based or solvent-based approaches to achieve a highly resolved 3D image for immunolabeling, immuno-cytochemistry, immuno-histochemistry, and/or immunofluorescence. In various embodiments, aqueous-based clearing approaches are generally used to avoid dehydration and toxicity, which can destroy the integrity of a sample.

In various embodiments, passive clarity technique (PACT) is a passive tissue clearing and immunolabeling protocol. In various embodiments PACT is used for intact thick organs. In various embodiments, RIMS includes a protocol for passive tissue clearing and immunostaining of intact organs that is compatible for long-term storage and has imaging media that preserves fluorescent markers over months.

In various embodiments, refractive index matching solutions (RIMS) may be produced with sugar or glycerol for simple, passive immersion. This may be used with thinner or smaller samples, as they are easier to clear and can maintain fluorescent protein emission. In various embodiments, such immersion techniques may achieve less than 1.5 refractive index and can take days to achieve clearing, resulting in reduced image quality when compared to solvent approaches, due to refractive index mismatching between the cleared sample, the glass coverslip, and immersion oil (glass and oil have an RI of 1.51). As sugar or glycerol solutions may take extended periods for clearing, a sample can experience considerable shrinkage while losing lipid content. In various embodiments, commercially available solutions control morphological alterations and loss of lipid content while achieving a higher refractive index of 1.52. In various embodiments, considerations for clearing include sample type and thickness so that there is minimal shrinkage of the sample and preservation of lipid content and fluorescence.

In various embodiments, perfusion-assisted agent release in situ (PARS) includes a method for whole-body clearing and phenotyping compatible with endogenous fluorescence. In various embodiments, all steps for PARS, including preservation, clearing, and labeling, are performed in situ prior to tissue extraction. In various embodiments, PARS, together with RIMS, transform opaque, intact, whole-organisms into optically transparent, fluorescently labeled samples for visualization with conventional confocal microscopy and phenotypic analysis at the cellular, subcellular, and/or single-molecule transcripts level as described in Yang et al., "Single-Cell Phenotyping within Transparent Intact Tissue through Whole-Body Clearing" *Cell* 158(4): 945-958 (2014) (https://doi.org/10.1016/j.cell.2014.07.017).

A biological sample may comprise one or a plurality of analytes of interest. The opto-fluidic instruments disclosed herein can be used to detect and analyze a wide variety of different analytes. In some aspects, an analyte can include any biological substance, structure, moiety, or component to be analyzed. For example, the analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g., an affinity binding partner) can be developed and detected (e.g., using the opto-fluidic instruments disclosed herein).

Analytes of particular interest may include nucleic acid molecules, such as DNA (e.g. genomic DNA, mitochondrial DNA, plastid DNA, viral DNA, etc.) and RNA (e.g. mRNA, microRNA, rRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof. The analyte may be a single molecule or a complex that contains two or more molecular subunits, e.g., including but not limited to complexes between proteins or peptides and nucleic acid molecules such as DNA or RNA, e.g., interactions between proteins and nucleic acids, e.g., regulatory factors, such as transcription factors, and DNA or RNA.

In some embodiments, the opto-fluidic instruments described herein can be utilized for the in situ detection and analysis of cellular analytes, (such as nucleic acid sequences), such as fluorescent in situ hybridization (FISH)-based methods, in situ transcriptomic analysis, or in situ sequencing, for example from intact tissues or samples in which the spatial information has been preserved. In some aspects, the embodiments can be applied in an imaging or detection method for multiplexed nucleic acid analysis. In some aspects, the provided opto-fluidic instruments can be used to detect a signal associated with a detectable label of a nucleic acid probe that is hybridized to a target sequence of a target nucleic acid in a biological sample.

Disclosed herein, in some aspects, are labelling agents (e.g., nucleic acid probes and/or probe sets) that are introduced into a cell or used to otherwise detect an analyte in a biological sample such as a tissue sample. The labelling agents include nucleic acid-based probes (e.g., the primary probes disclosed herein and/or any detectable probe disclosed herein) and may comprise any of a variety of entities that can hybridize to a nucleic acid, typically by Watson-Crick base pairing, such as DNA, RNA, LNA, PNA, etc. The nucleic acid probes may comprise a hybridization region that is able to directly or indirectly bind to at least a portion of a target sequence in a target nucleic acid. The nucleic acid probe may be able to bind to a specific target nucleic acid (e.g., an mRNA, or other nucleic acids disclosed herein).

Specific probe designs can vary depending on the application and any suitable probe or probe set may be utilized and detected using the opto-fluidic instruments described herein. In some aspects, the probes or probe sets described herein, or intermediate probes (e.g., a secondary probe, and/or a higher order probe) can be selected from the group consisting of a circular probe, a circularizable probe, and a linear probe. In some embodiments, a circular probe is pre-circularized prior to hybridization to a target nucleic acid and/or one or more other probes. In some embodiments, a circularizable probe is circularized (e.g., by ligation) upon hybridization to a target nucleic acid and/or one or more other probes such as a splint. In some embodiments, a linear probe can be one that comprises a target recognition sequence and a sequence that does not hybridize to a target nucleic acid, such as a 5' overhang, a 3' overhang, and/or a linker or spacer (which may comprise a nucleic acid sequence, such a one or more barcode sequence, or a non-nucleic acid moiety). In some embodiments, the sequence (e.g., the 5' overhang, 3' overhang, and/or linker or spacer) is non-hybridizing to the target nucleic acid but may hybridize to one another and/or one or more other probes, such as detectably labeled probes.

In some embodiments, a primary probe, a secondary probe, and/or a higher order probe disclosed herein can comprise a padlock-like probe or probe set, such as one described in U.S. Pat. No. 8,551,710, US 2020/0224244, US 2019/0055594, US 2021/0164039, US 2016/0108458, or US 2020/0224243, each of which is incorporated herein by reference in its entirety. Any suitable combination of the probe designs described herein can be used.

In some embodiments, the probes or probe sets described herein (e.g., a primary probe, or a secondary probe, and/or a higher order probe disclosed herein) can comprise two or more parts. In some cases, a probe can comprise one or more features of and/or be modified based on: a split FISH probe or probe set described in WO 2021/167526A1 or Goh et al., "Highly specific multiplexed RNA imaging in tissues with split-FISH," *Nat Methods* 17(7):689-693 (2020), which are incorporated herein by reference in their entireties; a Z-probe or probe set, such as one described in U.S. Pat. Nos. 7,709,198 B2, 8,604,182 B2, 8,951,726 B2, 8,658,361 B2, or Tripathi et al., "Z Probe, An Efficient Tool for Characterizing Long Non-Coding RNA in FFPE Tissues," *Noncoding RNA* 4(3):20 (2018), which are incorporated herein by reference in their entireties; an HCR initiator or amplifier, such as one described in U.S. Pat. No. 7,632,641 B2, US 2017/0009278 A1, U.S. Pat. No. 10,450,599 B2, or Choi et al., "Third-generation in situ hybridization chain reaction: multiplexed, quantitative, sensitive, versatile, robust," *Development* 145(12): dev165753 (2018), which are incorporated herein by reference in their entireties; a PLAYR probe or probe set, such as one described in US 2016/0108458 A1 or Frei et al., "Highly multiplexed simultaneous detection of RNAs and proteins in single cells," Nat Methods 13(3):269-75 (2016), which are incorporated herein by reference in their entireties; a PLISH probe or probe set, such as one described in US 2020/0224243 A1 or Nagendran et al., "Automated cell-type classification in intact tissues by single-cell molecular profiling," *eLife* 7:e30510 (2018), which are incorporated herein by reference in their entireties; a RollFISH probe or probe set such as one described in Wu et al., "RollFISH achieves robust quantification of single-molecule RNA biomarkers in paraffin-embedded tumor tissue samples," *Commun Biol* 1, 209 (2018), which is hereby incorporated by reference in its entirety; a MERFISH probe or probe set, such as one described in US 2022/0064697 A1 or Chen et al., "Spatially resolved, highly multiplexed RNA profiling in single cells," *Science* 348 (6233):aaa6090 (2015), which are incorporated herein by reference in their entireties; a primer exchange reaction (PER) probe or probe set, such as one described in US 2019/0106733 A1, which is hereby incorporated by reference in its entirety.

In some instances, probes and/or probe sets are directly labeled with one or more detectable labels (e.g., an optically detectable label, such as a florescent moiety) that are detected on the opto-fluidic instruments disclosed herein. In other instances, probes and/or probe sets comprise a target binding region and one or more nucleic acid barcode sequences that identify the analyte. In these embodiments, the barcode sequence(s) may be detected on the opto-fluidic instruments disclosed herein to identify the analyte in the sample. In some instances, a probe or probe set disclosed herein is a circularizable probe or probe set (e.g., a padlock probe or padlock-like probe) comprising a barcode region comprising one or more barcode sequences.

The probes and/or probe sets describe herein may comprise any suitable number of barcode sequences. In some embodiments, the probes or probe sets may comprise 1, 2, 3, 4, 5, 6, 7, 8, 9, 10, 11, 12, 13, 14, 15 or more, 20 or more, 30 or more, 40 or more, or 50 or more barcode sequences. As an illustrative example, a first probe may contain a first target-binding sequence, a first barcode sequence, and a second barcode sequence, while a second, different probe may contain a second target-binding sequence (that is different from the first target-binding sequence in the first probe), the same first barcode sequence as in the first probe, but a third barcode sequence instead of the second barcode sequence. Such probes may thereby be distinguished by determining the various barcode sequence combinations present or associated with a given probe at a given location in a sample.

In some embodiments, a labelling agent may include analyte binding moiety that interacts with an analyte (e.g., a protein) in the sample (e.g., a cell or tissue sample) and a reporter oligonucleotide comprising one or more barcode sequences associated with the analyte and/or analyte binding moiety. For example, a labelling agent that is specific to one type of cell feature (e.g., a first protein) may have coupled thereto a first reporter oligonucleotide, while a labelling agent that is specific to a different cell feature (e.g., a second protein) may have a different reporter oligonucleotide coupled thereto. In some embodiments, an analyte binding moiety includes, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. For a description of exemplary labelling agents, reporter oligonucleotides, and methods of use, see, e.g., U.S. Pat. 10,550,429; U.S. Pat. Pub. 20190177800; and U.S. Pat. Pub. 20190367969, which are each incorporated by reference herein in their entirety.

In some embodiments, the nucleic acid probes, probe sets, reporter oligonucleotides, barcode sequences, etc. may be detected directly on the opto-fluidic instruments disclosed herein (e.g., primary probes comprise a detectable label, such as a florescent moiety), and/or by using secondary (or higher order) nucleic acid probes able to bind to the primary probes. In some embodiments, the nucleic acid probes (e.g., primary probes and/or secondary probes) are compatible with one or more biological and/or chemical reactions. For instance, a nucleic acid probe disclosed herein can serve as a template or primer for a polymerase (e.g., a circularized probe in a rolling circle amplification (RCA) reaction), a template or substrate for a ligase, a substrate for a click chemistry reaction, and/or a substrate for a nuclease (e.g., endonuclease or exonuclease for cleavage or digestion). In some instances, labelling agents (such as a primary probe set) are added to a biological sample (e.g., a cell or tissue sample) using the opto-fluidic instrument and subsequently detected using opto-fluidic instrument (e.g., using detectably labeled primary probes, sequential hybridization of detectable labelled oligonucleotides to primary probes, in situ sequencing (e.g., SBS, SBL, SBH, and the like). In some instances, labelling agents (such as a primary probe set) are added to a biological sample (e.g., a cell or tissue sample) outside the opto-fluidic instrument and the sample is loaded onto the opto-fluidic instruments disclosed herein for detection (e.g., using sequential hybridization of detectable labelled oligonucleotides, in situ sequencing (e.g., SBS, SBL, SBH, and the like).

In some embodiments, detection of the analytes, probes, probe sets, barcodes, etc. described herein can be performed in situ on the opto-fluidic instruments disclosed herein. In situ sequencing typically involves incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (e.g., nucleotide sequence) of the incorporated nucleotides or labeled primer extension products can be determined, and consequently, the nucleotide sequence of the corresponding template nucleic acid. Aspects of in situ sequencing approaches are described, for example, in Mitra et al., "Fluorescent in situ sequencing on polymerase colonies" *Anal. Biochem.* 320:55-65 (2003), and Lee et al., "Highly Multiplexed Subcellular RNA Sequencing in situ" *Science,* 343(6177):1360-1363 (2014). In addition, examples of methods and systems for performing in situ sequencing are described in US 2016/0024555, US 2019/0194709, and in U.S. Pat. Nos. 10,138,509, 10,494,662 and 10,179,932.

In some embodiments, sequencing can be performed by sequencing-by-synthesis (SBS). In some embodiments, a sequencing primer is complementary to sequences at or near the target to be detected (e.g., one or more barcode(s)). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, US 2011/0059865, US 2005/0100900, U.S. Pat. No. 9,217,178, US 2009/0118128, US 2012/0270305, US 2013/0260372, and US 2013/0079232.

In some embodiments, sequence analysis of nucleic acids (e.g., nucleic acids such as RCA products comprising barcode sequences) can be performed by sequential hybridization (e.g., sequencing by hybridization and/or sequential in situ fluorescence hybridization). Sequential fluorescence hybridization can involve sequential hybridization of detection probes comprising an oligonucleotide and a detectable label. In some embodiments, a method disclosed herein comprises sequential hybridization of the detectable probes disclosed herein, including detectably labeled probes (e.g., fluorophore conjugated oligonucleotides) and/or probes that are not detectably labeled per se but are capable of binding (e.g., via nucleic acid hybridization) and being detected by detectably labeled probes. Exemplary methods comprising sequential fluorescence hybridization of detectable probes are described in US 2019/0161796, US 2020/0224244, US 2022/0010358, US 2021/0340618, and WO 2021/138676, MERFISH (described for example in Moffitt et al., "Chapter One—RNA Imaging with Multiplexed Error-Robust Fluorescence In situ Hybridization (MERFISH)" *Methods in Enzymology,* 572:1-49 (2016)), and hybridization-based in situ sequencing (HybISS) (described for example in Gyllborg et al., "Hybridization-based in situ sequencing (HybISS) for spatially resolved transcriptomics in human and mouse brain tissue," *Nucleic Acids Res* (2020) 48(19): e112) all of which are incorporated herein by reference.

In some embodiments, sequencing can be performed using sequencing by ligation (SBL). Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al., "Accurate Multiplex Polony Sequencing of an Evolved Bacterial Genome," *Science* 309:1728-1732 (2005), and in U.S. Pat. Nos. 5,599,675; 5,750,341; 6,969,488; 6,172,218; and 6,306,597. Exemplary techniques for in situ SBL comprise, but are not limited to, STARmap (described for example in Wang et al., "Three-dimensional intact-tissue sequencing of single-cell transcriptional states," *Science,* 361(6499):5691 (2018)) and US 2021/0164039).

In some embodiments, probe barcodes (e.g., plurality of probes or probe sets comprising one or more barcode sequences) or complements or products thereof are targeted by detectably labeled detection oligonucleotides, such as fluorescently labeled oligonucleotides. In some embodiments, one or more decoding schemes (e.g., sequential rounds of fluorescent probe hybridization) are used on the opto-fluidic instruments disclosed herein to decode the signals, such as fluorescence, for sequence identification. In any of the embodiments herein, barcodes (e.g., primary and/or secondary barcode sequences) can be analyzed (e.g., detected or sequenced using the opto-fluidic instruments disclosed herein) using any suitable methods or techniques, comprising those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), hybridization-based in situ sequencing (HybISS), in situ sequencing, targeted in situ sequencing, fluorescent in situ sequencing (FISSEQ), or spatially-resolved transcript amplicon readout mapping (STARmap). In some embodiments, the methods provided herein comprise analyzing the barcodes by sequential hybridization and detection with a plurality of labelled probes (e.g., detection oligonucleotides or detectable probes). Exemplary decoding schemes are described in Eng et al., "Transcriptome-scale Super-Resolved Imaging in Tissues by RNA SeqFISH+," *Nature* 568(7751):235-239 (2019); Chen et al., *Science;* 348(6233):aaa6090 (2015); Gyllborg et al., *Nucleic Acids Res* 48(19):e112 (2020); U.S. Pat. No. 10,457,980 B2; US 2016/0369329 A1; WO 2018/026873 A1; and US 2017/0220733 A1, all of which are incorporated by reference in their entirety. In some embodiments, these assays enable signal amplification, combinatorial decoding, and error correction schemes at the same time.

It is to be noted that, although the above discussion relates to an opto-fluidic instrument that can be used for in situ target molecule detection via probe hybridization, the discussion herein equally applies to any opto-fluidic instrument that employs any imaging or target molecule detection technique. That is, for example, an opto-fluidic instrument may include a fluidics module that includes fluids used for establishing the experimental conditions required for the probing of target molecules in the sample. Further, such an opto-fluidic instrument may also include a sample module configured to receive the sample, and an optics module including an imaging system for illuminating (e.g., exciting one or more fluorescent probes within the sample) and/or imaging light signals received from the probed sample. The opto-fluidic instrument may also include other ancillary modules configured to facilitate the operation of the opto-fluidic instrument, such as, but not limited to, cooling systems, motion calibration systems, etc.

In various embodiments, the opto-fluidic instrument may experience vibrations caused internally by, for example, the various modules (such non-limiting examples may include a cooling/heat transfer module) within the instrument and/or externally by, for example, mechanical vibrations within a laboratory in which the instrument is installed. For example, an internal vibration source can be a heat transfer module that may include pumps, cooling fans, etc., which may cause, when in operation, the instrument to vibrate during imaging of the sample. Examples of external sources of vibration include pedestrians, vehicles, etc., that are in motion in the vicinity of the opto-fluidic instrument, and may trigger ambient vibrations that cause vibrations or disturbances at the sample module and/or at the optics module. These vibrations caused by internal and/or external motion sources and experienced by the sample module may render some or all sample images captured by the imaging system to be inaccurate. For instance, the imaging system may be configured to capture the sample images at a rate that is not higher than the internal or external vibrations, which may result in the captured images being inaccurate representations of the sample (e.g., the images are shifted in XY and/or out-of-focus). In turn, such inaccurate images may lead to processing errors (e.g., if one or more images slices or volumes of the biological sample are unable to be analyzed) and/or longer run/processing times if images are reacquired. Accordingly, there exists a need for methods and systems for mitigating internal and external vibrational disturbances in opto-fluidic instruments.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

II. Example Descriptions of Terms

As used herein the specification, "a" or "an" may mean one or more. As used herein in the claim(s), when used in conjunction with the word "comprising," the words "a" or "an" may mean one or more than one. Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The use of the term "or" in the claims is used to mean "and/or" unless explicitly indicated to refer to alternatives only or the alternatives are mutually exclusive, although the disclosure supports a definition that refers to only alternatives and "and/or." For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment. As used herein "another" may mean at least a second or more.

The term "ones" means more than one.

As used herein, the term "plurality" can be 2, 3, 4, 5, 6, 7, 8, 9, 10, or more.

As used herein, the term "set of" means one or more. For example, a set of items includes one or more items.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" means item A; item A and item B; item B; item A, item B, and item C; item B and item C; or item A and C. In some cases, "at least one of item A, item B, or item C" means, but is not limited to, two of item A, one of item B, and ten of item C; four of item B and seven of item C; or some other suitable combination As used herein, the term "about" refers to include the usual error range for the respective value readily known. Reference to "about" a value or parameter herein includes (and describes) embodiments that are directed to that value or parameter per se. For example, description referring to "about X" includes description of "X". In some embodiments, "about" may refer to ±15%, ±10%, ±5%, or ±1% as understood by a person of skill in the art.

While the present teachings are described in conjunction with various embodiments, it is not intended that the present teachings be limited to such various embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

III. Opto-Fluidic Instruments for Analysis of Biological Samples

FIG. 1 shows an example workflow of analysis of a biological sample 110 (e.g., cell or tissue sample) using an opto-fluidic instrument 120, according to various embodiments. In various embodiments, the sample 110 can be a biological sample (e.g., a tissue) that includes molecules targeted for analysis (i.e., target molecules), such as DNA, RNA, proteins, antibodies, etc. In various embodiments, the biological sample is a fresh frozen tissue. In various embodiments, the biological sample is a formalin-fixed paraffin-embedded (FFPE) sample. For example, the sample 110 can be a sectioned tissue that is treated to access the RNA thereof for labeling with circularizable DNA probes. In various embodiments, ligation of the probes generates a circular DNA probe which can be enzymatically amplified and bound with fluorescent oligonucleotides to produce a sufficiently bright signal that facilitates image acquisition and has a high signal-to-noise ratio.

In various embodiments, the sample 110 may be placed in the opto-fluidic instrument 120 for analysis and detection of the target molecules in the sample 110. In various embodiments, the opto-fluidic instrument 120 is configured to facilitate the experimental conditions conducive for the detection of the target molecules. For example, the opto-fluidic instrument 120 can include a fluidics module 140, an optics module 150, a sample module 160, and at least one ancillary module 170, and these modules may be operated by a system controller 130 to create the experimental conditions for the probing of the target molecules in the sample 110 by selected probes (e.g., circularizable DNA probes), as well as to facilitate the imaging of the probed sample (e.g., by an imaging system of the optics module 150). In various embodiments, the various modules of the opto-fluidic instrument 120 may be separate components. In various embodiments, the various modules of the opto-fluid instrument may be in electrical communication with each other. In various embodiments, at least some of the modules of the opto-fluidic instrument 120 may be integrated together into a single module.

In various embodiments, the sample module 160 may be configured to receive the sample 110 in the opto-fluidic instrument 120. For instance, the sample module 160 may include a sample interface module (SIM) that is configured to receive a sample device (e.g., cassette) in which a substrate (having the sample 110 positioned thereon) can be secured. In various embodiments, the substrate is a glass slide. That is, the sample 110 may be placed in the opto-fluidic instrument 120 by securing the substrate having the sample 110 (e.g., the sectioned tissue) within the sample device that is then inserted into the SIM of the sample module 160. In various embodiments, the SIM includes an alignment mechanism configured to secure the sample device within the SIM and align the sample device in X, Y, and Z axes within the SIM. In some instances, the sample module 160 may also include an X-Y stage onto which the SIM is mounted. The X-Y stage may be configured to move the SIM mounted thereon (e.g., and as such the sample device containing the sample 110 inserted therein) in perpendicular directions along a two-dimensional (2D) plane of the opto-fluidic instrument 120. Additional discussion related to the SIM can be found in U.S. application Ser. No. 18/328,200, filed Jun. 2, 2023, titled "Methods, Systems, and Devices for Sample Interface," which is incorporated herein by reference in its entirety.

The experimental conditions that are conducive for the detection of the target molecules in the sample 110 may depend on the target molecule detection technique that is employed by the opto-fluidic instrument 120. For example, in various embodiments, the opto-fluidic instrument 120 can be a system that is configured to detect molecules in the sample 110 via hybridization of probes. In such cases, the experimental conditions can include molecule hybridization conditions that result in the intensity of hybridization of the target molecule (e.g., nucleic acid) to a probe (e.g., oligonucleotide) being significantly higher when the probe sequence is complementary to the target molecule than when there is a single-base mismatch. The hybridization conditions include the preparation of the sample 110 using reagents such as washing/stripping reagents, hybridizing reagents, etc., and such reagents may be provided by the fluidics module 140.

In various embodiments, the fluidics module 140 may include one or more components that may be used for storing the reagents, as well as for transporting said reagents to and from the sample device containing the sample 110. For example, the fluidics module 140 may include one or more reservoirs configured to store the reagents, as well as a waste container configured for collecting the reagents (e.g., and other waste) after use by the opto-fluidic instrument 120 to analyze and detect the molecules of the sample 110. In various embodiments, the one or more reservoirs include one or more high use reagent reservoirs. In various embodiments, the fluidics module 140 may be configured to receive one or more low use reagent plates (e.g., a 96 deep well plate). Further, the fluidics module 140 may also include pumps, tubes, pipettes, etc., that are configured to facilitate the transport of the one or more reagents (such non-limiting examples may include high use reagent and/or low use reagent) to the sample device and thus contact the sample 110 with the reagent (such non-limiting examples may include high use reagent and/or low use reagent). For instance, the fluidics module 140 may include one or more pumps ("reagent pumps") that are configured to pump washing and/or stripping reagents (i.e., high use reagents) to the sample device for use in washing and/or stripping the sample 110. In various embodiments, the fluidics module 140 may be configured for other washing functions such as washing an objective lens of the imaging system of the optics module 150.

In various embodiments, the ancillary module 170 includes a cooling system (i.e., a heat transfer system) of the opto-fluidic instrument 120. In various embodiments, the cooling system includes a network of coolant-carrying tubes configured to transport coolant to various modules of the opto-fluidic instrument 120 for regulating the temperatures thereof. In such cases, the ancillary module 170 may include one or more heat transfer components of a heat transfer circuit. In various embodiments, the heat transfer components include one or more coolant reservoirs for storing coolants and pumps (e.g., "coolant pumps") for generating a pressure differential, thereby forcing the coolants to flow from the reservoirs to the various modules of the opto-fluidic instrument 120 via the coolant-carrying tubes. In some instances, the heat transfer components of the ancillary module 170 may include returning coolant reservoirs that may be configured to receive and store returning coolants, i.e., heated coolants flowing back into the returning coolant reservoirs after absorbing heat discharged by the various modules of the opto-fluidic instrument 120. In such cases, the ancillary module 170 may also include one or more cooling fans that are configured to force air (e.g., cool and/or ambient air) to the external surfaces of the returning coolant reservoirs to thereby cool the heated coolant(s) stored therein. In some instance, the ancillary module 170 may also include one or more cooling fans that are configured to force air directly to one or more components of the opto-fluidic instrument 120 so as to cool said one or more components. For one non-limiting example, the ancillary module 170 may include cooling fans that are configured to directly cool by forcing ambient air past the system controller 130 to thereby cool the system controller 130.

As discussed above, the opto-fluidic instrument 120 may include an optics module 150 which include the various optical components of the opto-fluidic instrument 120, such as but not limited to a camera, an illumination module (such non-limiting examples may include one or more LEDs and/or one or more lasers), an objective lens, and/or the like. The optics module 150 may include a fluorescence imaging system that is configured to image the fluorescence emitted by the probes (e.g., oligonucleotides) in the sample 110 after the probes are excited by light from the illumination module of the optics module 150. In some instances, the optics module 150 may also include an optical frame onto which the camera, the illumination module, and/or the X-Y stage of the sample module 160 may be mounted.

In various embodiments, the system controller 130 may be configured to control the operations of the opto-fluidic instrument 120 (e.g., and the operations of one or more modules thereof). In some instances, the system controller 130 may take various forms, including a processor, a single computer (or computer system), or multiple computers in communication with each other. In various embodiments, the system controller 130 may be communicatively coupled with a data storage, a set of input devices, a display system, or a combination thereof. In various embodiments, some or all of these components may be considered to be part of or otherwise integrated with the system controller 130, may be separate components in communication with each other, or may be integrated together. In other embodiments, the system controller 130 can be, or may be in communication with, a cloud computing platform.

In various embodiments, the opto-fluidic instrument 120 may analyze the sample 110 and generate the output 190 that includes indications of the presence of the target molecules in the sample 110. For instance, with respect to the example embodiment discussed above where the opto-fluidic instrument 120 employs a hybridization technique for detecting molecules, the opto-fluidic instrument 120 may perform a plurality of probing rounds on the sample 110. During the plurality of probing rounds, the sample 110 undergoes successive rounds of fluorescent probe hybridization (using two or more sets of fluorescent probes, where each set of fluorescent probes is excited by a different color channel) and is volumetrically imaged in a plurality of z-stacks to detect target molecules in the probed sample 110 in three dimensions. In such cases, the output 190 may include a plurality of light signals at specific three-dimensional locations over the plurality of probing cycles. In various embodiments, an optical signature (e.g., a codeword) specific to each gene is determined from the detected optical signals at each three-dimensional location across the plurality of probing cycles, which allows the identification of the target molecules.

IV. Experimental Determination of Vibration Sources

FIGS. 2A-4C illustrate vibrations experienced by a sample device of an opto-fluidic instrument (such as opto-fluidic instrument 120) as a result of the operations of a coolant pump and cooling fans (FIGS. 2A-2C), as a result of the operations of cooling fans only (FIGS. 3A-3C), and in the absence of operations of pumps and cooling fans (FIG. 4A-4C) of the opto-fluidic instrument, according to various embodiments. In various embodiments, beads were placed on a sample device in a sample module of an opto-fluidic instrument as stand-in for samples to determine vibrations that may be experienced by the samples due to vibration sources that are internal to the opto-fluidic instrument (e.g., the opto-fluidic instrument, and components thereof may be the same as those discussed with reference to FIG. 1). As discussed above, the opto-fluidic instrument includes an ancillary module containing movable components such as pumps, cooling fans, etc., that can be sources of vibrations. For example, the ancillary module may include one or more coolant pumps that may be used to pump coolant throughout a heat transfer circuit, such as between coolant reservoirs of the opto-fluidic instrument and the various modules (e.g., optics module, fluidics module, sample module) that the coolant is used for regulating the temperatures thereof. Further, the ancillary module may include one or more cooling fans that can be used to force ambient or cooled air past the external surfaces of the coolant reservoirs, one or more heat sinks, the system controller (e.g., electronic components, etc.) of the opto-fluidic instrument to thereby cool the components.

Figure 2A:
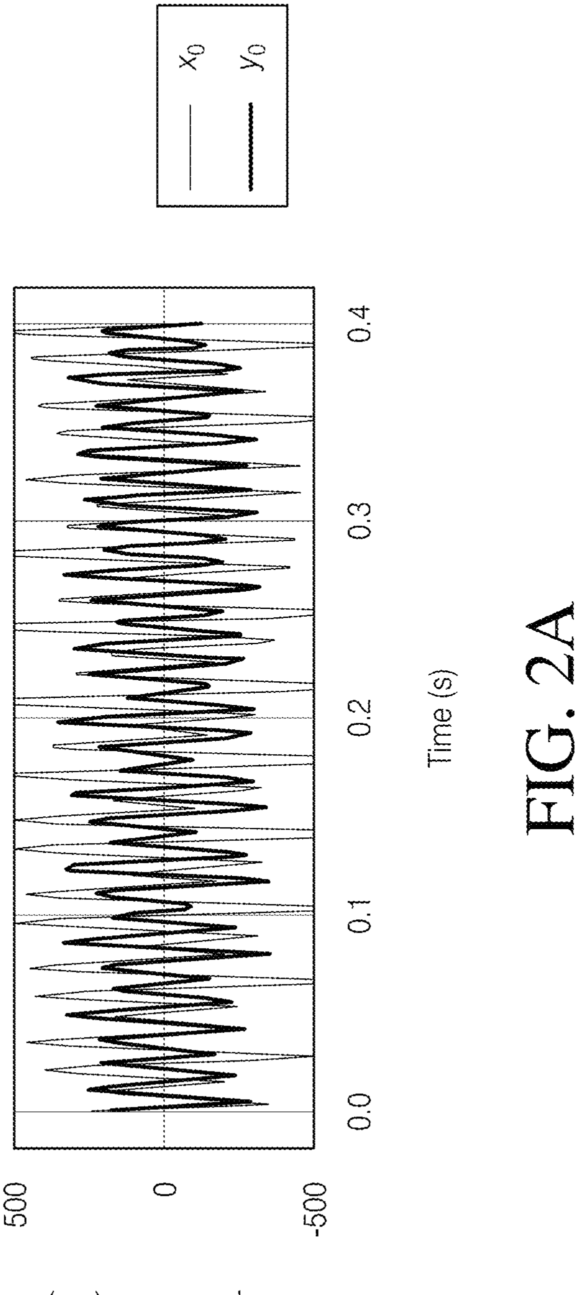
FIGS. 2A-2C illustrate vibrations experienced by a sample device of an opto-fluidic instrument as a result of the operations of a coolant pump and cooling fans of the opto-fluidic instrument, according to various embodiments.
Figure 2B:
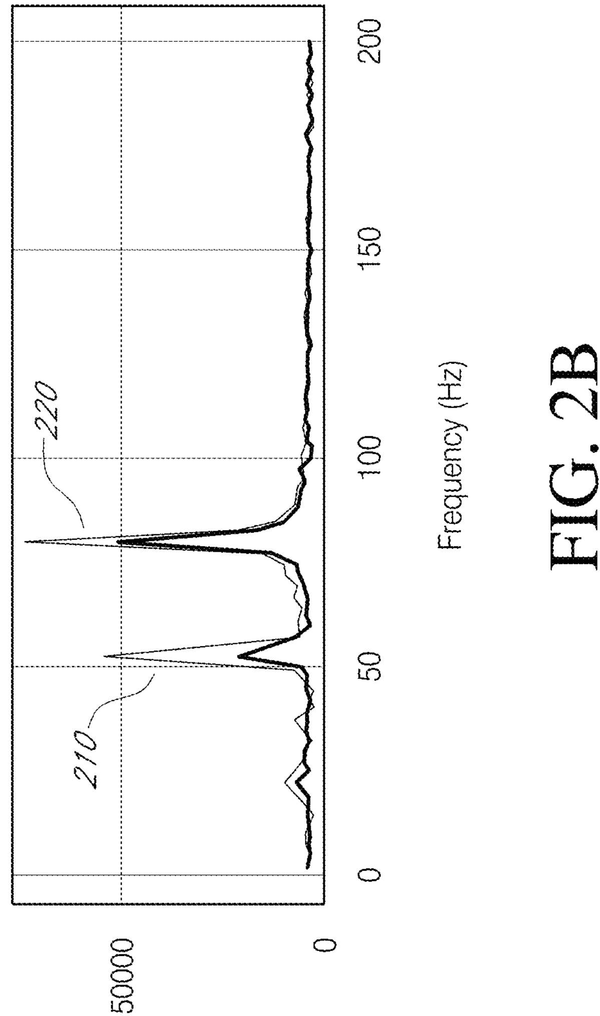
Figure 2C:
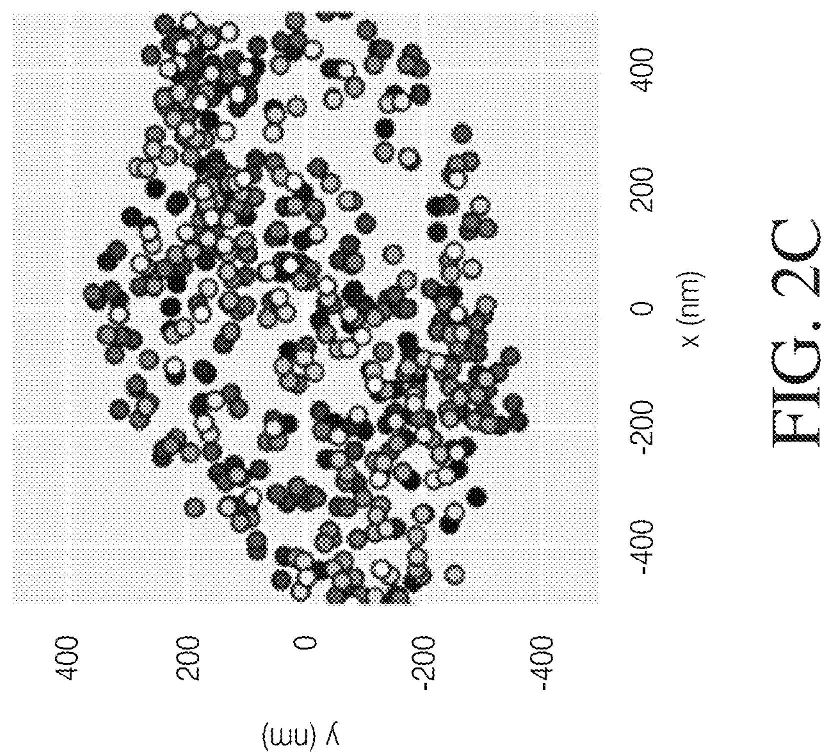

FIGS. 2A-2C illustrate vibrations experienced by the sample device of an opto-fluidic instrument as a result of the operations of a coolant pump and cooling fans of the opto-fluidic instrument, according to various embodiments. In particular, FIG. 2A shows the 2D displacement of a bead over the surface of the sample device over a time period that the coolant pump and cooling fans are in operation (e.g., during imaging of a sample), which is further illustrated by a dot plot of x and y displacements of the beads shown in FIG. 2C. In the example embodiments of FIGS. 2A-2C, the bead displacements have an amplitude of about ±500 nm in one direction (labeled "x-direction") and about ±400 nm in the perpendicular direction ("y-direction"). In some instances, the vibrations (e.g., amplitudes and frequencies) that are experienced by the sample device and are sources of the bead displacements shown in FIGS. 2A and 2C can be measured by an accelerometer that is coupled to the sample device. FIG. 2B shows said amplitudes and frequencies of the vibrations occurring during the same time period as that shown in FIG. 2A, illustrating that the vibrations are mainly due to two frequency modes 210, 220, the first frequency mode 210 being about 50 Hz and the second frequency mode 220 being about 80 Hz (e.g., in the example embodiments of FIGS. 2A-2C).

Figure 3A:
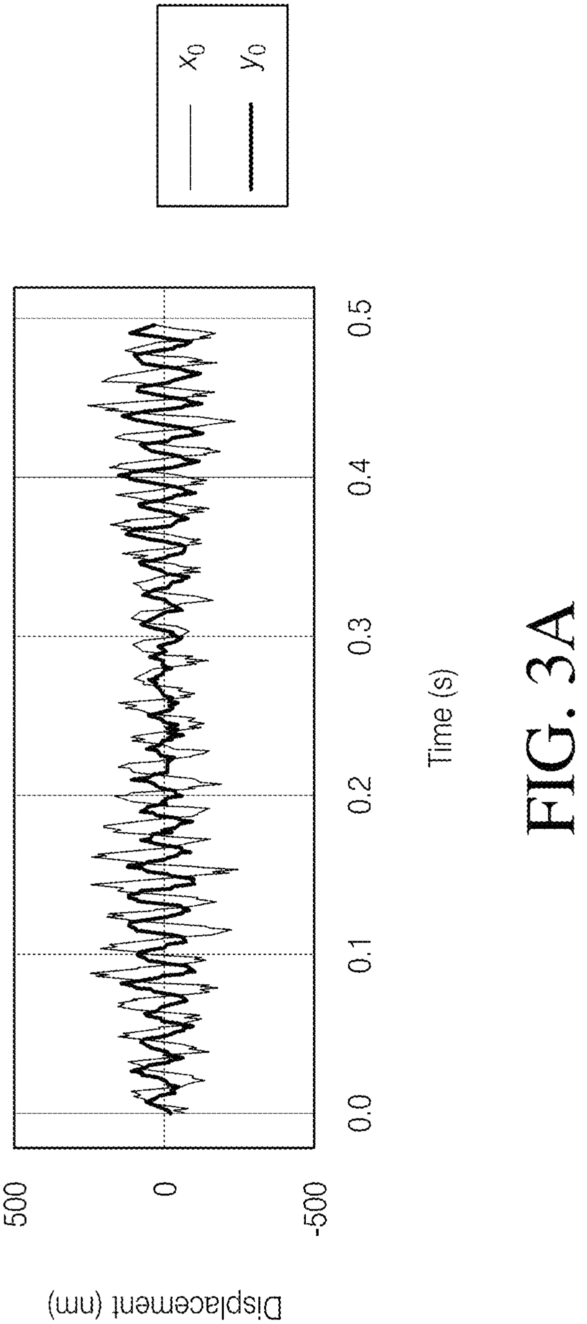
FIGS. 3A-3C illustrates vibrations experienced by a sample device of an opto-fluidic instrument as a result of the operations of cooling fans of the opto-fluidic instrument, according to various embodiments.
Figure 3B:
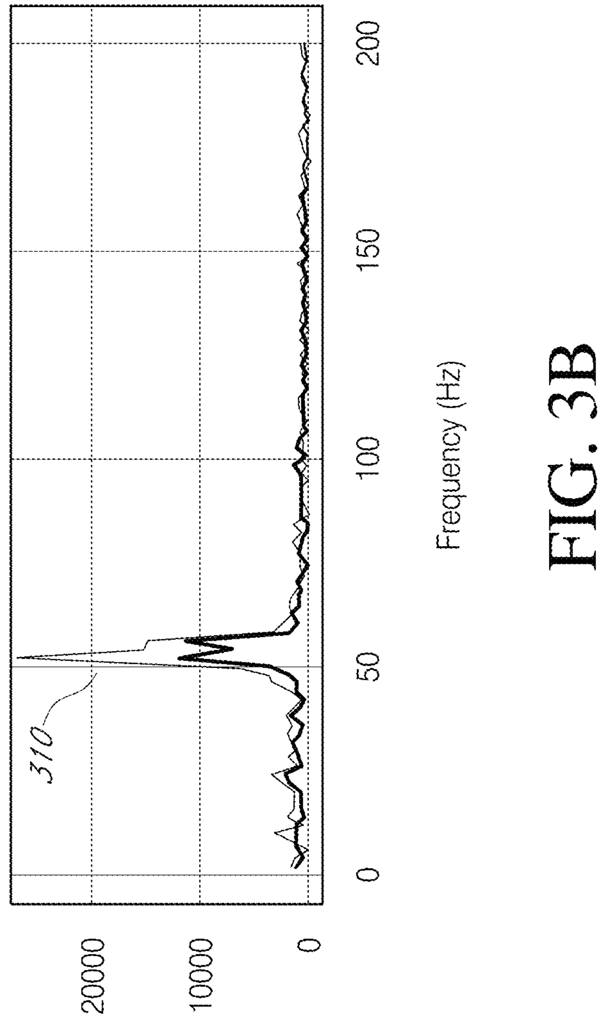
Figure 3C:
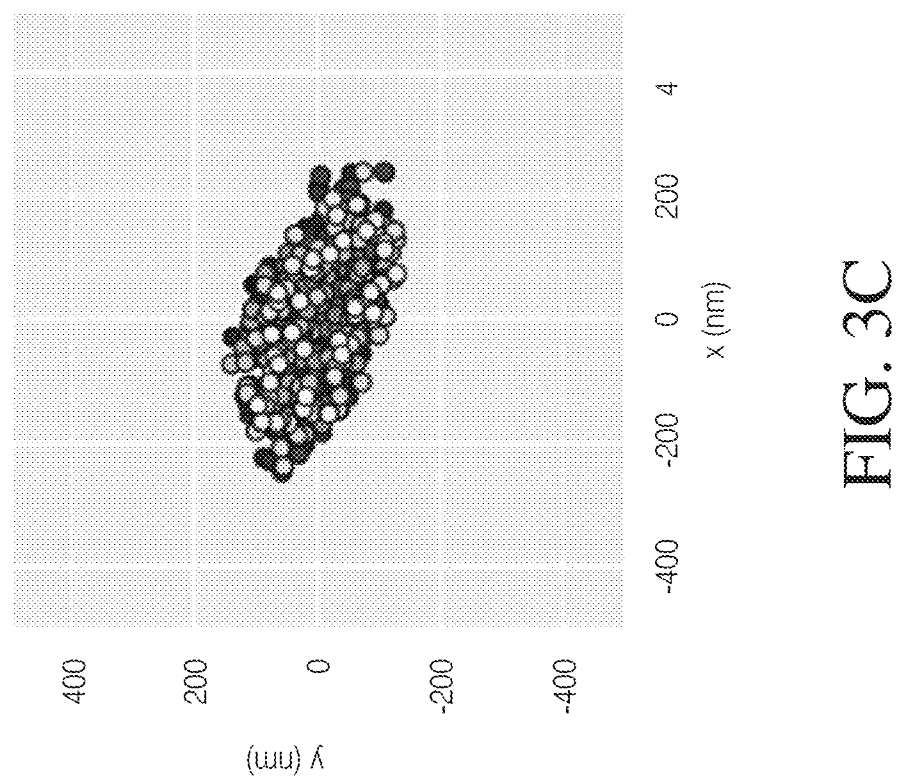

With reference to FIGS. 3A-3C, the experiment of FIGS. 2A-2C was repeated with the coolant pump off but with the cooling fans in operation. That is, in some instances, the 2D displacements of the beads were measured as discussed above with respect to FIGS. 2A-2C with the coolant pump off (e.g., and the cooling fans operating). FIGS. 3A and 3C show reduced amplitudes of bead displacements (e.g., compared to FIGS. 2A and 2C) of about ±250 nm in the x-direction and about ±175 nm in the y-direction. Further, FIG. 3B shows the amplitudes and frequencies of the vibrations experienced by the sample device, illustrating that the vibrations are mainly due to a single frequency mode 310 in the vicinity of about 50 Hz. From a comparison of FIGS. 2A-2C to FIGS. 3A-3C, it can be deduced that the single frequency mode 310 corresponds to the first frequency mode 210 and that the second frequency mode 220 shown in FIG. 2B is due to the operation of the coolant pump. That is, it can be deduced that the coolant pump of the ancillary module of the opto-fluidic instrument is an internal source of vibrations at the sample device of the opto-fluidic instrument (e.g., at a frequency of around 80 Hz).

Figure 4A:
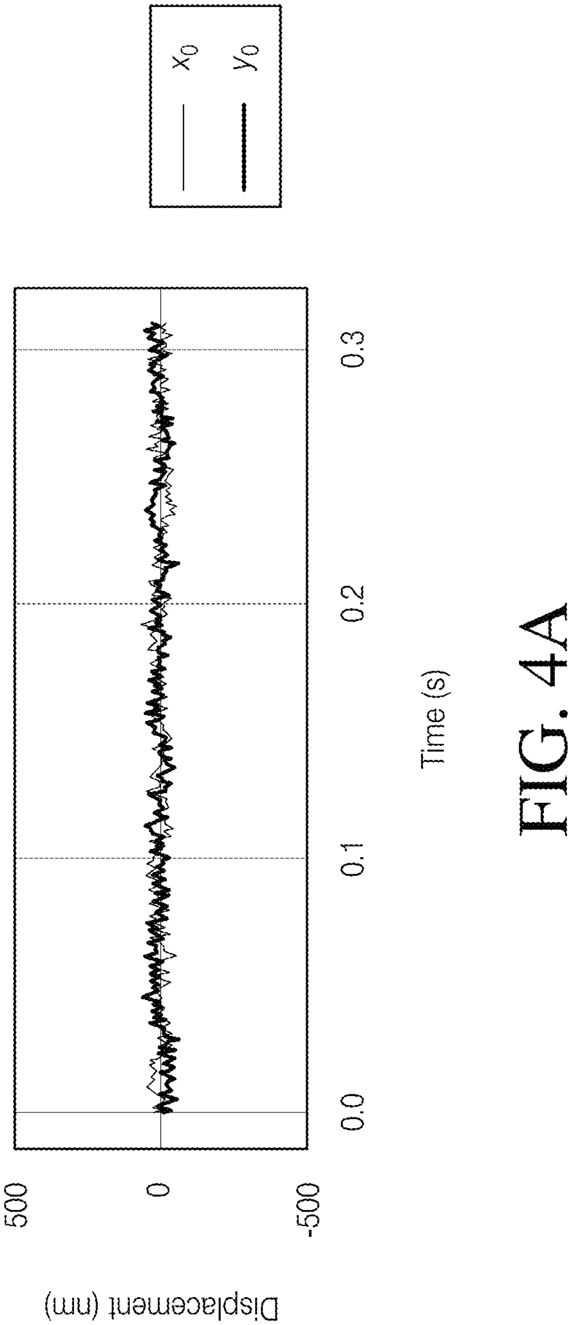
FIGS. 4A-4C illustrates vibrations experienced by a sample device of an opto-fluidic instrument in the absence of operations of pumps and cooling fans of the opto-fluidic instrument, according to various embodiments.
Figure 4B:
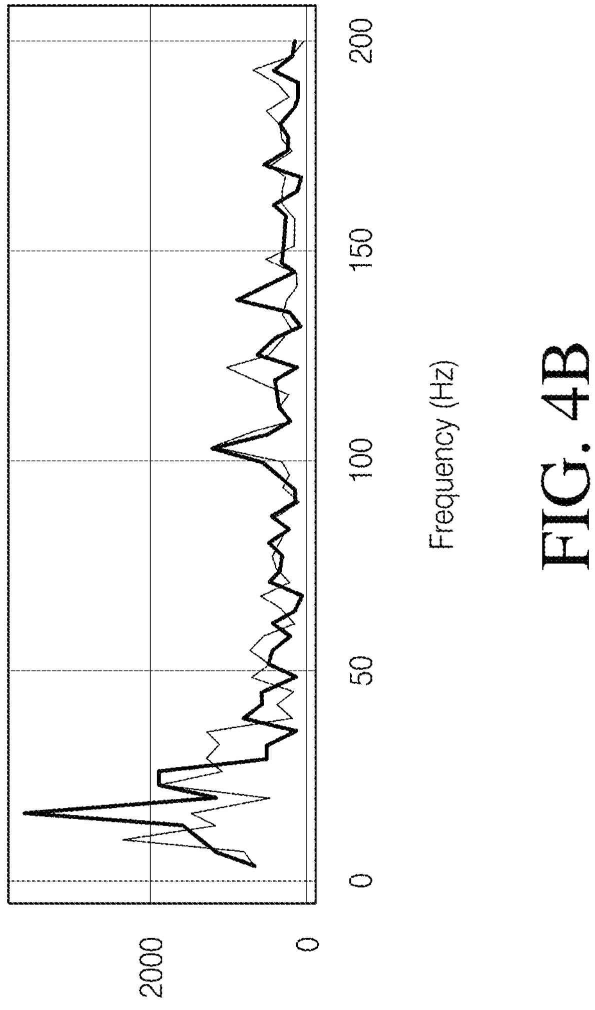
Figure 4C:
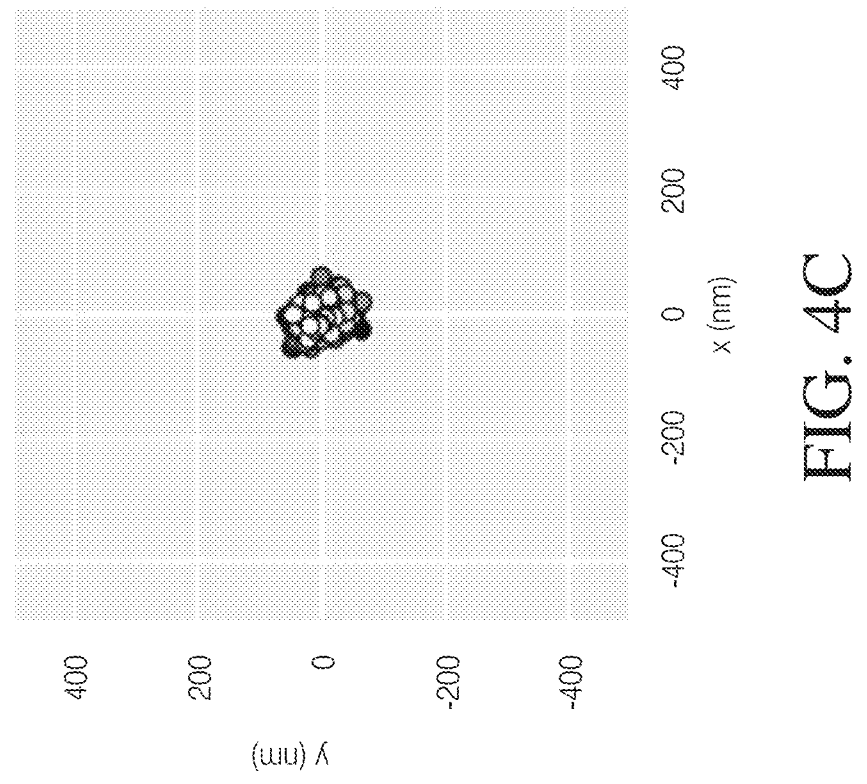

With reference to FIGS. 4A-4C, the experiment of FIGS. 2A-2C or FIGS. 3A-3C was repeated with both the coolant pump and the cooling fans turned off. That is, in some instances, the 2D displacements of the beads were measured as discussed above with respect to FIGS. 2A-2C or FIGS. 3A-3C with both the coolant pump and the cooling fans turned off. FIGS. 4A and 4C show reduced amplitudes of bead displacements (e.g., compared to FIGS. 2A and 2C) of about ±75 nm in both the x-direction and the y-direction. Further, FIG. 4B shows minimal vibrations experienced by the sample device (e.g., compared to the vibrations shown in FIG. 2B or FIG. 3B). From a comparison of FIGS. 2A-2C, FIGS. 3A-3C, and FIGS. 4A-4C, it can be deduced that the single frequency mode 310 shown in FIG. 3B (which corresponds to the first frequency mode 210 of FIG. 2B) is due to the operation of the cooling fans. That is, it can be deduced that the cooling fans of the ancillary module of the opto-fluidic instrument are internal sources of vibrations at the sample device of the opto-fluidic instrument (e.g., at a frequency of around 50 Hz).

The example embodiments of FIGS. 2A-4C illustrate that the ancillary module of the opto-fluidic instrument may be configured to vibrate at one or more frequencies when the ancillary module is in operation (e.g., during imaging of the sample). For instance, the coolant pumps, and/or the cooling fans may be operating individually or in at the same time and may cause the opto-fluidic instrument to vibrate at the one or more frequencies within a vibration frequency range (VFR) bounded by a lower frequency limit and a higher frequency limit. In some instances, the lower frequency limit can be the minimum frequency below which the ancillary module may not vibrate at, or may not be capable of vibrating at. In some instances, the higher frequency limit can be the maximum frequency above which the ancillary module may not vibrate at, or may not be capable of vibrating at. In various embodiments, the VFR of the ancillary module can be from about 25 Hz to about 75 Hz, from about 30 Hz to about 65 Hz, from about 35 Hz to about 60 Hz, from about 40 Hz to about 55 Hz, about 50 Hz, from about 75 Hz to about 125 Hz, from about 85 Hz to about 115 Hz, from about 95 Hz to about 105 Hz, about 100 Hz, from about 50 Hz to about 100 Hz, including values and subranges therebetween. In some instances, one or more of these vibration frequency ranges and values can be due to the fans only, the pumps only, or combination thereof.

V. Vibrational Mitigation Systems

In various embodiments, depending on the location of the opto-fluidic instrument, the sample device in the sample module of the opto-fluidic instrument (e.g., and any samples placed thereon) may also experience vibrations that are generated by sources that are external to the opto-fluidic instrument. Examples of such external sources of vibration include pedestrians, vehicles, mechanical components of buildings, etc., that are in motion in the vicinity of the opto-fluidic instrument, and as such, trigger vibrations that can be transferred (e.g., via the ground, walls, the supporting structure of the opto-fluidic instrument, etc.) to the opto-fluidic instrument. The frequencies of vibrations due to pedestrian movements (e.g., walking, running, etc.) or other ambient motional vibration transferred through the building floor can be in the range from about 2 Hz to about 6 Hz, from about 2 Hz to about 4 Hz, from about 4 Hz to about 6 Hz, including values and subranges therebetween.

Figure 5:
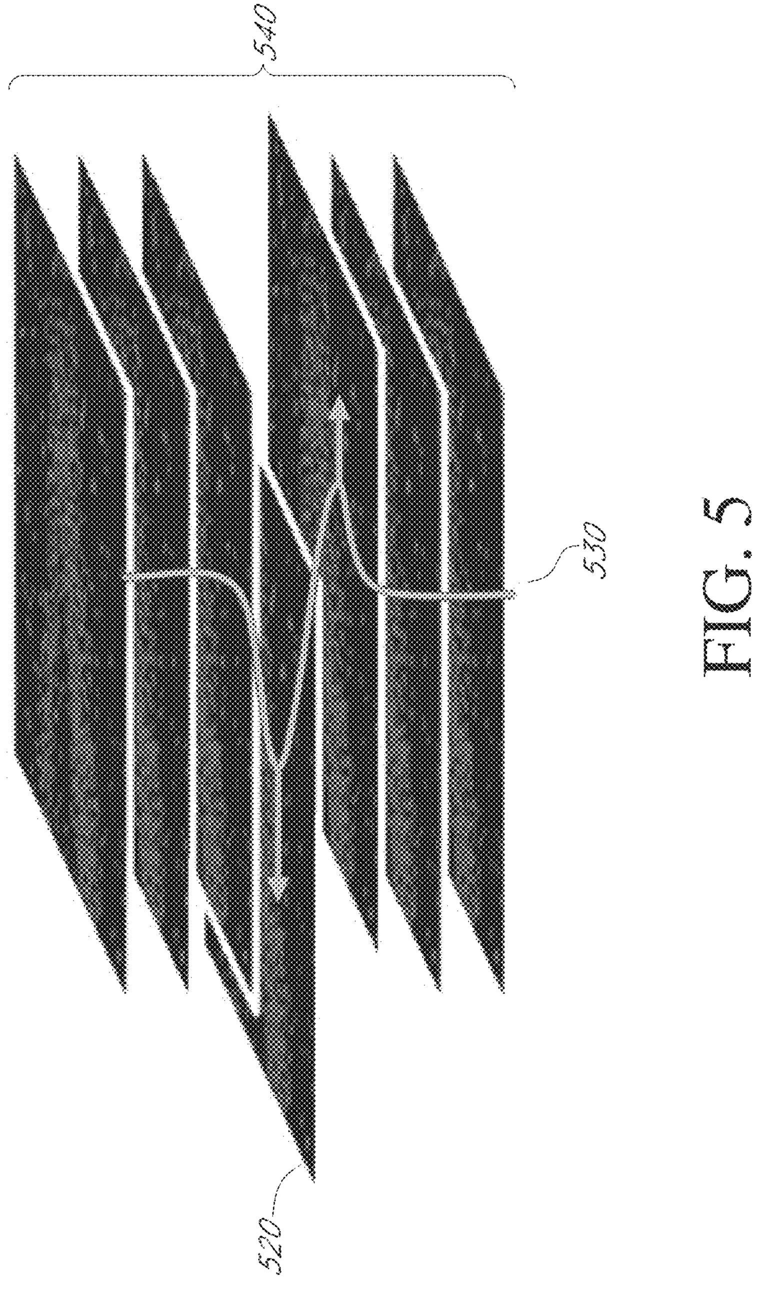
FIG. 5 is a schematic of the occurrence of stack shearing of a 2D slice image of a sample due to the presence of a disturbance during the imaging of the sample, according to various embodiments.

The vibrations at the sample device from internal and/or external sources of vibrations can hamper accurate imaging of samples that are placed on the sample device. For example, an imaging system (e.g., such as a fluorescence imaging system of the optics module 150 of FIG. 1) may be capturing 3D microscopic images of the sample, and in such cases, one may wish to minimize the vibrations that are experienced by the sample during the imaging process so that the captured images are not distorted representations of the sample. For instance, the imaging system may obtain a 3D image of a sample by capturing multiple 2D slice images of the sample, and in such cases, a vibration may cause one or more individual 2D slice images to be displaced and misaligned with the rest of the 2D slice images of the sample. FIG. 5 shows an example schematic of such "stack shearing" where a vibration 530 causes a 2D slice image 520 of the 3D stack images 540 (e.g., comprising multiple 2D slice images including the displaced 2D slice image 520) to not be co-located with the rest of the 2D slice images of the 3D stack images 540, resulting in a distorted 3D image of the sample.

In various embodiments, the distortion of an image of a sample in a sample device may be related to the amplitude of the vibration that causes the stack shearing. For example, the displacement of a stack-sheared 2D slice image with respect to the rest of the 2D slice images of a sample may be related (e.g., proportional) to the amplitude of the vibration at the sample device that caused the stack shearing. As such, the distortions to images of a sample due to vibrations at the sample device can be reduced or minimized by reducing or minimizing the amplitudes of the vibrations at the sample device. In some instances, the amplitudes of the vibrations at the sample device (e.g., and as such the amplitudes of the vibrations experienced by the sample) can depend on the resonance frequencies of parts of the opto-fluidic instrument via which the vibrations from the internal and/or external sources travel to arrive at the sample device. This is because a system oscillates with higher amplitudes when driven by a vibration source oscillating at the resonance frequencies of the system than when the vibration source oscillates at non-resonance frequencies. As such, the vibrations from an internal source such as the ancillary module of the opto-fluidic instrument may be dampened (e.g., the amplitudes of the vibrations may be reduced) at the sample by using a system, with a resonance frequency different from the frequency of the internal source vibrations, to isolate the samples from the internal source vibrations. Further, the vibrations from an external source such as pedestrians, cars, etc., moving in the vicinity of the opto-fluidic instrument may be dampened (e.g., the amplitudes of the vibrations may be reduced) at the sample by using a system, with a resonance frequency different from the frequency of the internal source vibrations, to isolate the opto-fluidic instrument from the external source vibrations.

Figure 6:
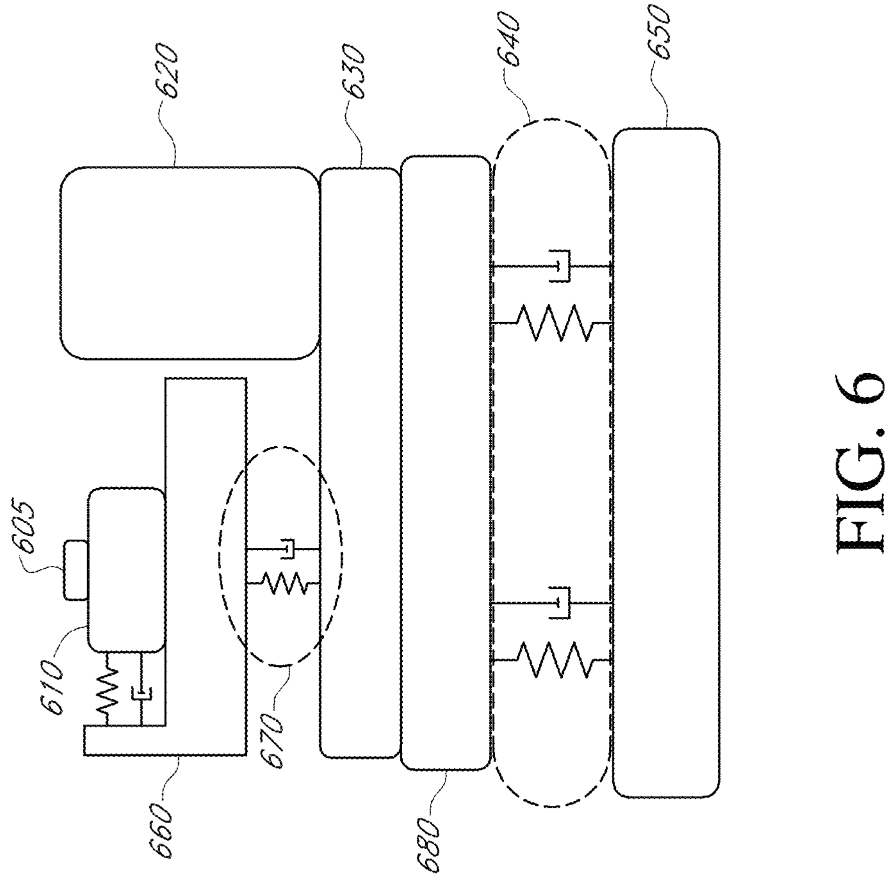
FIG. 6 is a schematic of systems for mitigating vibrations at a sample device of an opto-fluidic instrument, according to various embodiments.

FIG. 6 shows such an example system 600 for mitigating vibrations at a sample device 605 in a sample module of an opto-fluidic instrument, according to various embodiments. In various embodiments, the system 600 can be part of the opto-fluidic instrument, and/or include parts of the opto-fluidic instrument. In various embodiments, the system 600 can include a sample device 605 (e.g., cassette) onto which a sample can be deposited and an X-Y stage 610 configured to control the 2D movement of the sample device 605 within the opto-fluidic instrument. For example, the opto-fluidic instrument may include a sample module that has a SIM configured to receive the sample device 605. Further, the sample module may include the X-Y stage 610 onto which the SIM (e.g., and as such the sample device 605 with the sample thereon) may be mounted. In addition, the system 600 may also include a fluidics module 620. In some instances, the sample module, the sample device 605, and the fluidics module 620 of system 600 may be the same or substantially similar to the sample module 160, the sample device, and the fluidics module 140 of the opto-fluidic instrument 120 of FIG. 1.

In various embodiments, the system 600 may include an optical frame 660 configured to support the X-Y stage 610, and in some cases, additional components of the optics module of the opto-fluidic instrument. For example, the X-Y stage 610, as well as an illumination module and a camera that may be used for imaging the sample on the sample device 605, may be mounted on the optical frame 660. In some instances, the optical frame 660 of system 600 may be the same or substantially similar to the optical frame of the optics module 150 of the opto-fluidic instrument 120 of FIG. 1. For example, the optical frame 660 may have associated therewith one or more resonance peak frequencies that lie within an optical frame RFR. Further, the optical frame 660 can have multiple RFRs, within each of which there can be one or more resonance peak frequencies. That is, the optical frame 660 can have associated therewith one or more RFRs, where each RFR has at least one resonance peak frequency.

Although the discussion herein relates to the system 600 for mitigating vibrations that includes the X-Y stage 610, the fluidics module 620, the optical frame 660, the chassis 630, etc., it is apparent from the discussion that the disclosure equally applies to an opto-fluidic instrument that includes a first module (e.g., an ancillary module having a cooling system) that is configured to vibrate at one or more frequencies within a VFR when the system is in operation, a second module (e.g., which may or may not be an optics module) that includes a frame (e.g., which may or may not be an optical frame) and a stage (e.g., which may or may not be an X-Y stage) mounted on the frame, the frame having a first resonance frequency within a first resonance frequency range (RFR).

In various embodiments, the RFR of the optical frame 660 can be from about 10 Hz to about 20 Hz, from about 12 Hz to about 20 Hz, from about 15 Hz to about 20 Hz, about 50 Hz, including values and subranges therebetween. In some instances, the optical frame 660 may be fitted with or coupled to a vibrational isolator 670 that is configured to dampen the vibrations arriving at the optical frame (e.g., and at components mounted thereon such as the X-Y stage 610, the camera, the illumination module, etc.). In some cases, said vibrational isolator 670, once coupled to the optical frame 660, may cause the resonance frequency of the optical frame 660 to be tuned to fall within a desired RFR, such as any of the RFRs listed above. As an example, the vibrational isolator 670 can be rubber materials fitted to the optical frame 660 as rubber feet separating the optical frame 660 from the chassis 630 of the system 600 or the opto-fluidic instrument. In some instances, the vibrational isolator 670 may be integrated into the optical frame 660 such that a reference to the optical frame 660 may be understood to include the vibrational isolator 670.

In various embodiments, the system 600 may include the chassis 630 of the opto-fluidic instrument. That is, the various components of the opto-fluidic instrument such as but not limited to the sample module including the X-Y stage 610, the optics module including the optical frame 660, the fluidics module 620, etc., may be enclosed by the chassis 630. In some instances, the chassis 630 may be configured to couple to a floating/isolated bed 680 that is configured to isolate the chassis 630 from the environment external to the chassis 630 (e.g., and as such to the opto-fluidic instrument). For example, the floating/isolated bed 680 can be a platform, a tabletop (e.g., isolated tabletop, active air tabletop, semi-active pneumatic air tabletop, etc.) that is configured to couple to the chassis and support the opto-fluidic instrument.

In various embodiments, the combined opto-fluidic instrument, floating/isolated bed, and vibrational isolator 640 may have associated therewith one or more resonance peak frequencies that lie within a RFR. In some instances, the RFR of the combined opto-fluidic instrument, floating/isolated bed 680, and floating/isolated bed 640 can range from about 0.5 Hz to about 2 Hz, from about 0.5 Hz to about 1 Hz, from about 0.5 Hz to about 0.75 Hz, about 0.5 Hz, including values and subranges therebetween. In various embodiments, the floating/isolated bed 680 and the vibrational isolator 640 may be configured to dampen vibrations (e.g., ambient vibrations due to movements by pedestrian and various objects such as cars) arriving at the floating/isolated bed 680 (e.g., and at the opto-fluidic instrument supported thereby). In some cases, said vibrational isolator 640, once coupled to the floating/isolated bed 680, may cause the resonance frequency of the floating/isolated bed 680 to be tuned to fall within a desired RFR, such as any of the RFRs of the combined opto-fluidic instrument, floating/isolated bed 680, and vibration isolator 640. In some instances, the vibrational isolator 640 may be integrated into the floating/isolated bed 680 such that a reference to the floating/isolated bed 680 may be understood to include the vibrational isolator 640.

In various embodiments, vibrations at the X-Y stage 610 of the opto-fluidic instrument (e.g., and as such at the sample device of the opto-fluidic instrument supported by the X-Y stage 610) may be mitigated by a system 600 that has modules, components, etc., with VFRs and/or RFRs that are well separated from each other as well as from the frequency ranges of other vibration sources (e.g., walking pedestrians, etc.) such that resonances in the opto-fluidic instrument are reduced or eliminated, i.e., none of the modules, components, etc. are driven at their resonance frequencies due to vibrations from internal and/or external sources. For example, as noted above, the vibrational isolator 640 is configured to isolate the chassis 630 (e.g., and as such the opto-fluidic instrument enclosed by the chassis 630) from the external environment 650. In such cases, the vibrational isolator 640 may be selected such that the RFR of the combined opto-fluidic instrument, floating/isolated bed 680, and vibrational isolator 640 is separated from the frequencies of vibrations coming from external sources (e.g., pedestrians, cars, etc., moving in the vicinity of the opto-fluidic instrument) by an amount enough to avoid resonances. That is, the frequency separations between the RFR of the vibrational isolator 640 (with floating/isolated bed 680 and the opto-fluidic instrument coupled thereto) and the frequencies of vibrations from the external sources are large enough for the vibrational isolator 640 not to be driven into resonance by the vibrations from the external sources.

As another example, as noted above, the optical frame 660 is configured to support the X-Y stage 610. To mitigate vibrations at the X-Y stage 610 due to the vibrations of the ancillary module (e.g., the cooling system), the optical frame 660 may be selected such that its RFR is separated from the VBR of the ancillary module by an amount enough to avoid resonances. That is, the frequency separation between the RFR of the optical frame 660 and the VBR of the ancillary module may be large enough for the optical frame 660 not to be driven into resonance by the vibrations from the ancillary module. As yet another example, the optical frame 660, the vibrational isolator 640, and the floating/isolated bed 680 may be selected such that their respective RFRs are separated from each other by a frequency separation large enough such that a vibration in either one (e.g., a vibration capable of propagating through either one) would not be capable of driving a resonance in the other.

Figure 7:
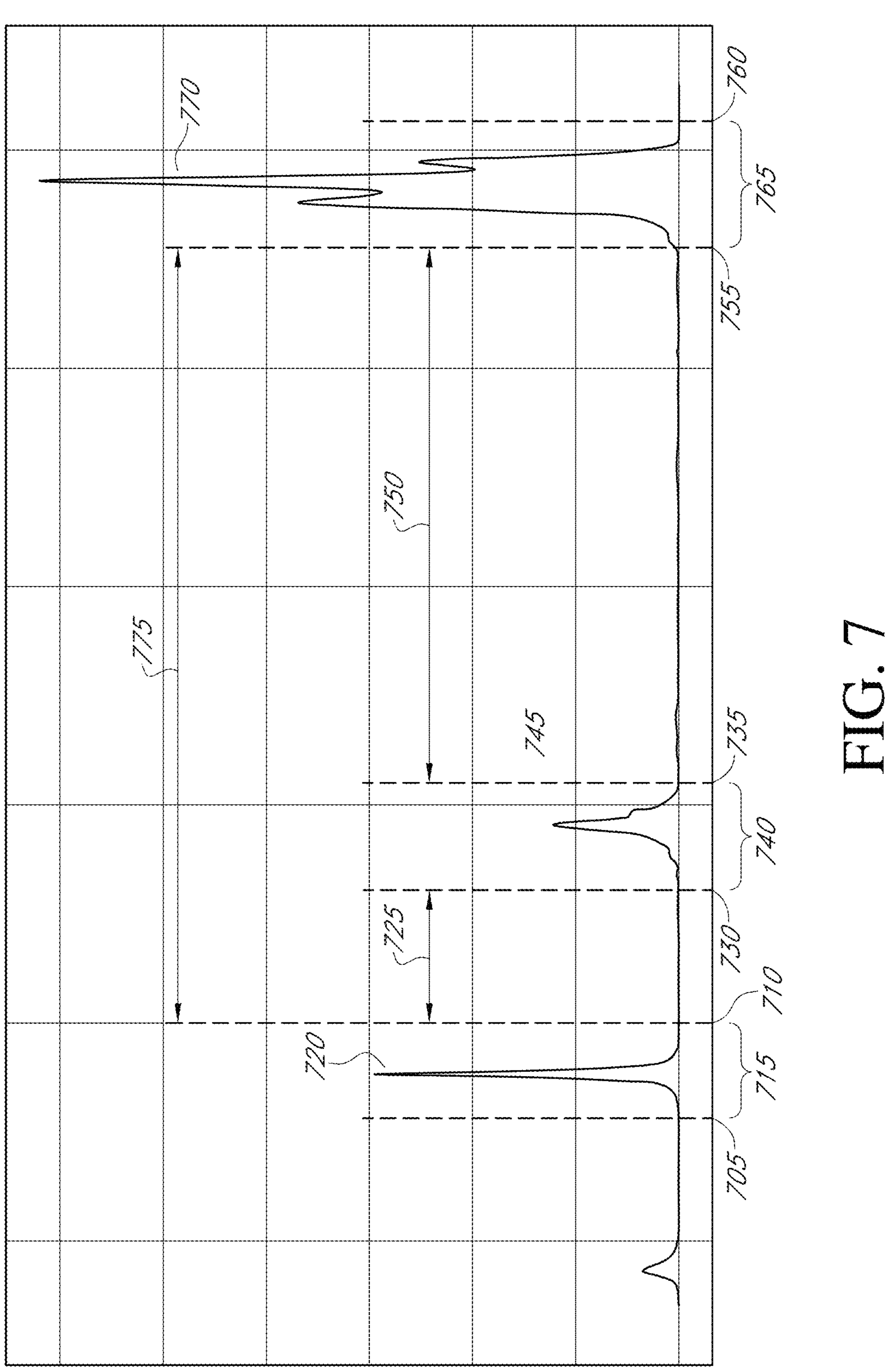
FIG. 7 is an example illustration of resonance frequencies of various modules in an opto-fluidic instrument, according to various embodiments.

FIG. 7 shows an example illustration of resonance frequencies of various modules in an opto-fluidic instrument, according to various embodiments. For example, as discussed above, the ancillary module (e.g., cooling system) of an opto-fluidic instrument may have associated therewith a VFR 765 ranging between a lower frequency limit 755 and a higher frequency limit 760 and encompassing the one or more frequencies 770 at which the ancillary module vibrates. For instance, the various parts of the ancillary module such as pumps, fans, etc., when the ancillary module is in operation, may cause the ancillary module to operate at one or more frequencies 770 lying within the VFR 765. Further, an optical frame of the opto-fluidic instrument may have associated therewith a RFR 740 ("optical frame RFR" or "first RFR") ranging between a lower frequency limit 730 and a higher frequency limit 735 encompassing one or more resonance peak frequencies 745 of the optical frame. In addition, the combined opto-fluidic instrument, floating/isolated bed 680, and vibrational isolator 640 may have associated therewith one or more resonance peak frequencies 720 that lie within a RFR 715 ("chassis vibration isolation device RFR" or "second RFR") ranging between a lower frequency limit 705 and a higher frequency limit 710.

In various embodiments, as mentioned above, VFRs and/or RFRs may be separated from each other such that there occur minimal or no resonances in the opto-fluidic instrument and that vibrations are mitigated at the sample device of the opto-fluidic instrument carrying the sample. In some instances, the separation between a first frequency range and a second frequency range, where the first frequency range and/or the second frequency range can be a VFR or RFR, may be a factor of $N_1$ times the higher frequency limit of the frequency range that encompasses lower peak frequency value. For example, the separation 750 between the VFR 765 of the ancillary module and the RFR 740 of the optical frame may be a factor of $N_2$ times the higher frequency limit 735 of the RFR 740 (e.g., which has the lower peak frequency value 745 than the higher peak frequency values 770 encompassed by the VFR 765). As another example, the separation 725 between the RFR 740 of the optical frame and the RFR 715 of the chassis vibration isolation device may be a factor of $N_3$ times the higher frequency limit 710 of the RFR 715 (e.g., which has the lower peak frequency value 720 than the higher peak frequency value 745 encompassed by the RFR 740). As yet another example, the separation 775 between the VFR 765 of the ancillary module and the RFR 715 of the chassis vibration isolation device may be a factor of $N_4$ times the higher frequency limit 710 of the RFR 715 (e.g., which has the lower peak frequency value 720 than the higher peak frequency values 770 encompassed by the VFR 765). In some instances, two or more of $N_1$, $N_2$, $N_3$, or $N_4$ can be equal, or can have different values.

In various embodiments, $N_1$, $N_2$, $N_3$, or $N_4$ can be a number (e.g., a real number) in the range from about 1 to about 50, from about 1 to about 25, from about 1 to about 10, from about 2 to about 40, from about 2 to about 20, from about 2 to about 10, from about 2 to about 3, from about 5 to about 50, from about 5 to about 40, from about 5 to about 20, from about 5 to about 15, from about 5 to about 10, from about 10 to about 50, from about 10 to about 25, from about 10 to about 15, from about 20 to about 50, from about 20 to about 40, from about 20 to about 25, including values and subranges therebetween. In some instances, the value of $N_1$, $N_2$, $N_3$, or $N_4$ is such that the X-Y stage or the sample device located thereon experiences a vibrational displacement amplitude that is less than a threshold displacement amplitude when the opto-fluidic instrument is in operation. For example, the threshold displacement amplitude can be in the range from about 50 nm to about 250 nm, from about 75 nm to about 150 nm, from about 90 nm to about 120 nm, from about 95 nm to about 105 nm, about 100 nm, including values and subranges therebetween.

In the discussion above, separations between various RFRs, various VFRs, and between RFRs and VFRs are defined in terms of frequency separations from the limits of the ranges. For example, FIG. 7 shows the frequency separation 750 as between the lower frequency limit 755 of the VFR 765 of the ancillary module and the higher frequency limit 745 of the RFR 740 of the optical frame. However, this is for example purposes and that a frequency separation between frequency ranges can be defined in terms of other features of the frequency ranges, including the frequency peaks encompassed by the frequency ranges. For instance, the frequency separation 750 between VFR 765 and RFR 740 can be defined in terms of the peak frequencies encompassed by VFR 765 and RFR 740, i.e., peak frequency values 770 and peak frequency value 745.

Some embodiments of the present disclosure disclose a system comprising an optics module, an ancillary module (e.g., a cooling system), and a chassis. In various embodiments, the ancillary module is configured to vibrate at one or more frequencies within a vibrational frequency range (VFR) when the system is in operation. Further, the optics module includes an optical frame having a camera, an illumination module, and an X-Y stage mounted thereon, the optical frame having a first resonance frequency within a first resonance frequency range (RFR). In some instances, the ancillary module and the optical frame are mounted on the chassis. In some instances, the chassis is configured to couple to a chassis vibration isolation device (a) configured to isolate the chassis from an external environment and (b) having a second resonance frequency within a second RFR. In various embodiments, for a first frequency range selected from (i) the first RFR, (ii) the second RFR, and (iii) the VFR, that has higher peak frequency than a second frequency range that is different from the first frequency range and is selected from (a) the first RFR, (b) the second RFR, and (c) the VFR, a lower frequency range limit of the first frequency range is greater than a higher frequency range limit of the second frequency range by at least a factor of N>2. In some instances, N ranges from about 2 to about 3, from about 5 to about 15, or from about 20 to about 40.

In various embodiments, the disclosed system comprises the chassis vibration isolation device. Further, the optical frame includes an optical frame vibration isolation device configured to couple the optical frame to the chassis and shift a natural resonance frequency range of the optical frame to the RFR. In various embodiments, the chassis vibration isolation device is a semi-active pneumatic vibration isolator.

In various embodiments, the VFR ranges from about 50 to about 100 Hz. In various embodiments, the first RFR ranges from about 10 Hz to about 20 Hz. In various embodiments, the second RFR ranges from about 1 Hz to about 2 Hz. In various embodiments, the first RFR and the second RFR are such that the X-Y stage experiences a vibrational displacement amplitude that is less than a threshold displacement amplitude when the system is in operation in an international standards organization (ISO) operating theatre environment. In some instances, the threshold displacement amplitude is about 100 nm.

Some embodiments of the present disclosure disclose a system for dampening vibrations, comprising a first module, a second module, and a vibration isolation device. In various embodiments, the first module is configured to vibrate at one or more frequencies within a vibrational frequency range (VFR) when the system is in operation. In various embodiments, the second module includes a frame and a stage mounted on the frame, the frame having a first resonance frequency within a first resonance frequency range (RFR). Further, the vibration isolation device can have a second resonance frequency within a second RFR. In various embodiments, for a first frequency range selected from (i) the first RFR, (ii) the second RFR, and (iii) the VFR, that has higher peak frequency than a second frequency range that is different from the first frequency range and is selected from (a) the first RFR, (b) the second RFR, and (c) the VFR, a lower frequency range limit of the first frequency range is greater than a higher frequency range limit of the second frequency range by at least a factor of N>2. Further, the factor N is such that the stage experiences a vibrational displacement amplitude that is less than a threshold displacement amplitude when the system is in operation. In various embodiments, the values of N can range from about 2 to about 3, from about 5 to about 15, from about 20 to about 40. In some instances, the threshold displacement amplitude is about 100 nm. In various embodiments, the VFR ranges from about 50 to about 100 Hz. In various embodiments, the first RFR ranges from about 10 Hz to about 20 Hz. In various embodiments, the second RFR ranges from about 1 Hz to about 2 Hz.

Figure 8:
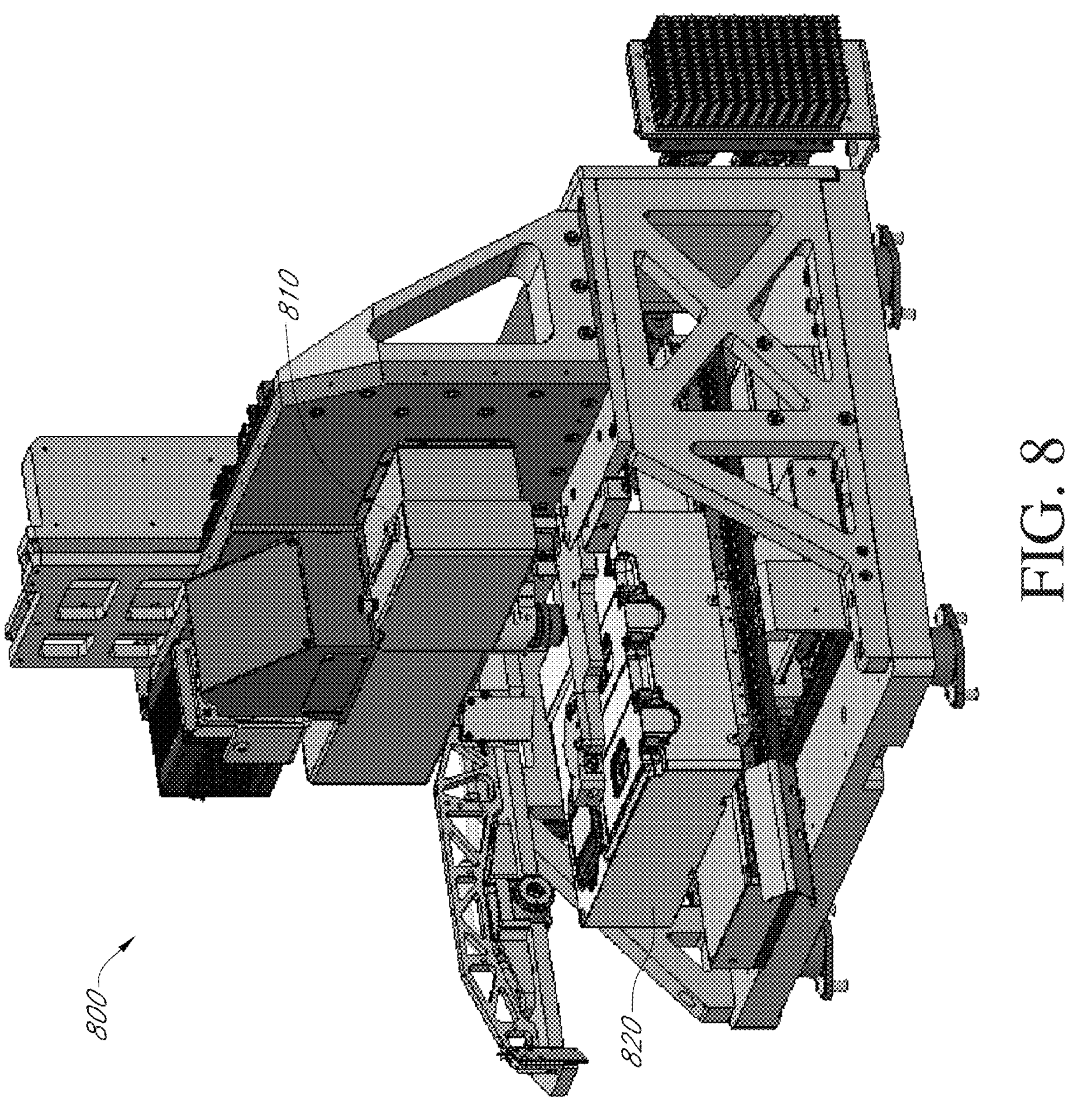
FIG. 8 illustrates an exemplary subsystem of an opto-fluidic instrument including optics head and stage motion modules, according to various embodiments.

FIG. 8 illustrates an exemplary subsystem 800 of an opto-fluidic instrument including optics head module 810 and a stage motion module 820. In various embodiments, the optics head module 810 includes one or more illumination sources configured to illuminate a sample with one or more colors (e.g., one or more LEDs configured to emit one or more predetermined spectrums), one or more excitation filters configured to filter light from the illumination source(s), one or more emission filters configured to filter light signals received from the sample, an objective lens (e.g., a 20× 1.0 NA water dipping objective), a tube lens, and/or a camera configured to image light signals from a biological sample (e.g., a small pixel, large sensor, fast readout CMOS sensor).

Figure 9A:
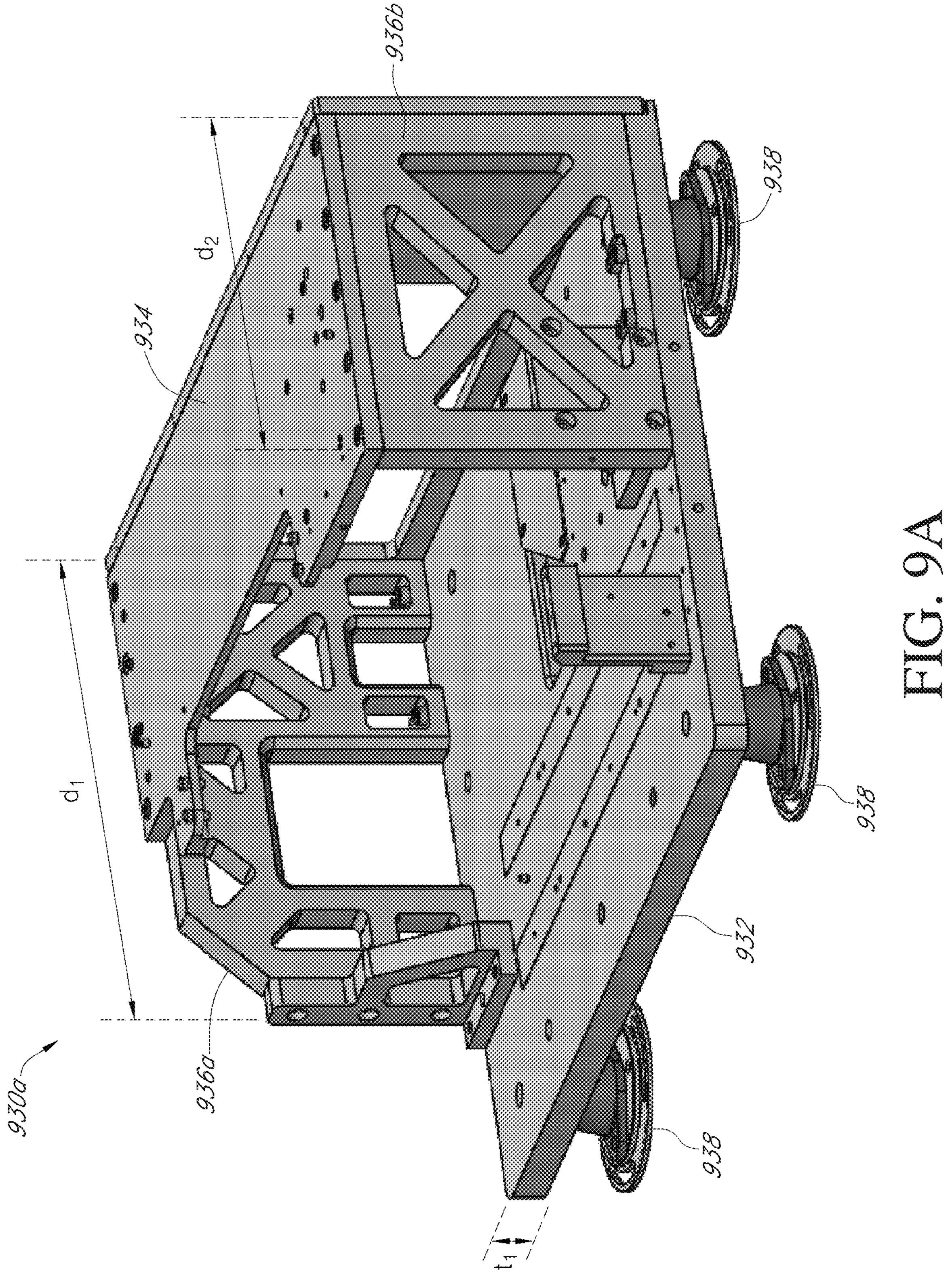
FIG. 9A illustrates an exemplary vibration mitigation frame configured to support optics head and stage motion modules in an opto-fluidic instrument, according to various embodiments.

FIG. 9A illustrates an exemplary vibration mitigation frame 930*a configured to* support optics head and stage motion modules in an opto-fluidic instrument. The frame 930 includes a base plate 932 onto which the stage motion module is affixed, a top plate 934 onto which the optics head module is affixed, side plates 936*a*, 936*b*, and one or more vibration isolators 938 disposed on the bottom plate 932. In various embodiments, the side plates 936*a*, 936*b* comprise a plurality of cutouts (e.g., to reduce weight of the part). As shown in FIG. 9A, the side plates each extend a length $d_1$, which is less than the full length of the base plate 932. As shown in FIG. 9A, the base plate 932 has a thickness $t_1$ and the top plate has a length $d_2$.

Figure 9B:
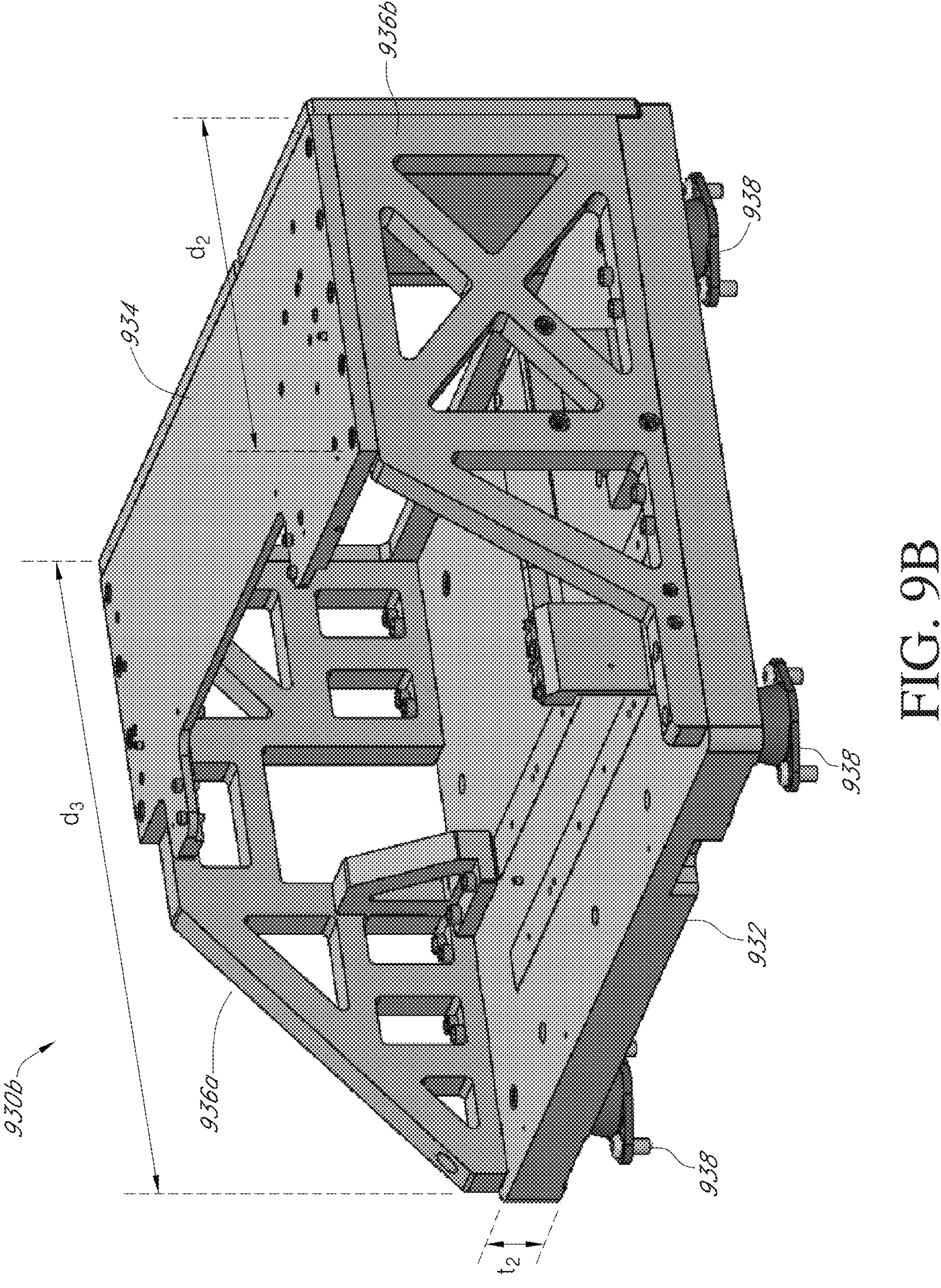
FIG. 9B illustrates a vibration mitigation frame with stiffening improvements, according to various embodiments.

FIG. 9B illustrates a vibration mitigation frame 930*b* with stiffening improvements. As shown in FIG. 9B, each side plate 936*a*, 936*b* has been extended to a length $d_3$ that is about the same as (e.g., equal to) the full length of the base plate 932. In various embodiments, the extended side plates 936*a*, 936*b* stiffen the base plate and reduce cantilever bending that may occur in the unsupported end of the base plate of FIG. 9A. In various embodiments, the thickness $t_2$ of the base plate 932 is increased to thereby increase the stiffness of the base plate 932 and reduce deflection of the plate due to vibrations. In various embodiments, $t_2$ is about 50% greater than $t_1$. In various embodiments, increasing the thickness of the baseplate 932 lowers the center of mass of the assembly and increases stability of the optics head module.

Figure 10A:
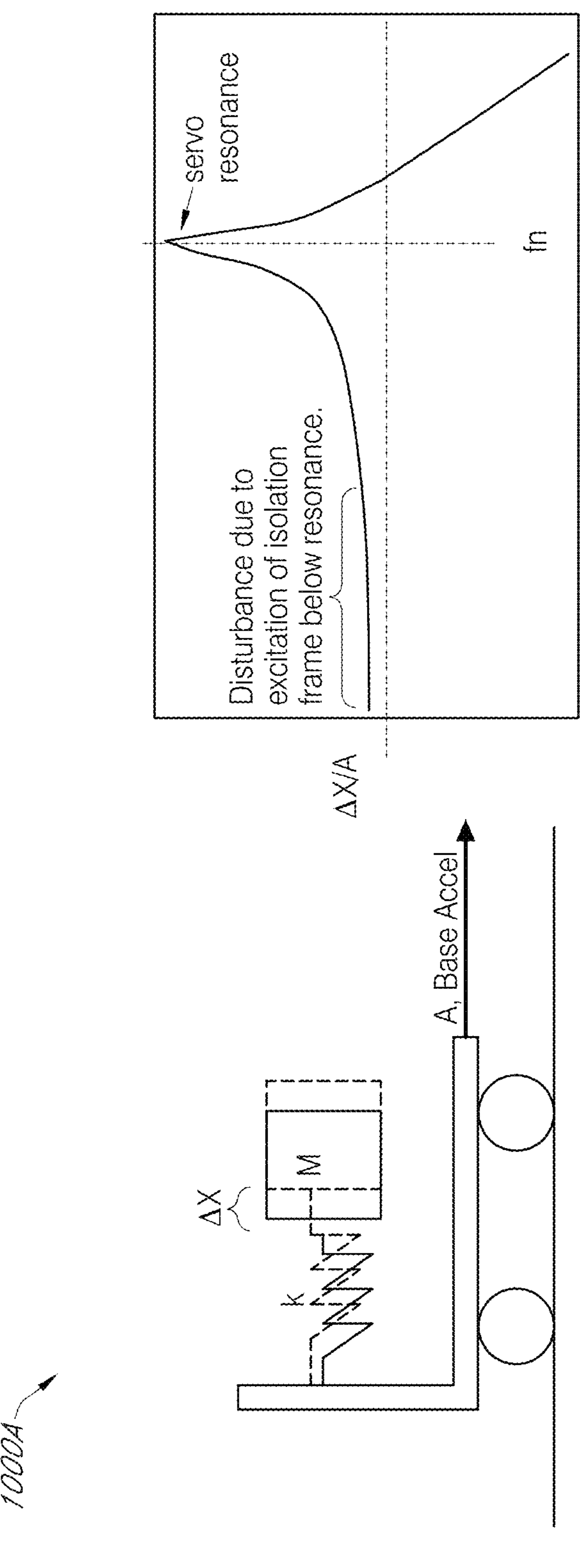
FIG. 10A illustrates an exemplary model of a linear stage servo motor control system, according to various embodiments.

FIG. 10A illustrates an exemplary model 1000A of a linear stage servo motor control system. In various embodiments, a servo motor control system can be modelled as a spring mass oscillator. In various embodiments, each of the X and Y stages (having the sample disposed in a sample carrier) have an equivalent electromagnetic spring and damper to form a spring mass oscillator. In various embodiments, the Z stage (onto which optical components are mounted, such as the objective lens) has an equivalent electromagnetic spring to form a spring mass oscillator. In various embodiments, a sensitivity frequency response function (FRF) may be determined to consider how inertial forces associated with isolation platform accelerations act on the X, Y and/or Z stages. In various embodiments, the first mode of a given axis of the servo system will determine the sensitivity FRF of that stage axis to the base accelerations of the isolated optics frame. In various embodiments, the sensitivity FRF to base acceleration is defined as the relative displacement of the moving mass per unit uniform acceleration of the base, as a function of frequency. There are three frequency ranges in the sensitivity FRF: 1. static response below resonance; 2. amplification near resonance; and 3. isolation above resonance. In various embodiments, the sensitivity at low frequency, in the frequency range below the isolation frame resonances, is often the dominant range of for a lumped mass 55 Hz oscillator this sensitivity is about 8 um/m/s^2, or about 82 um/g, or 82 nm/milli-g, in the frequency range below resonance. In various embodiments, the static sensitivity is equal to the inverse of the servo resonant frequency squared, 1/(2π*fn)^2. Thus, a doubling of the servo resonance decreases the stage error by 4×. At a "static" response to base acceleration below resonance $$k_o \Delta X = M_o\ A_b \quad \text{Eq. 1.1}$$

the inertial force is resisted by the spring force as shown below:

$$\frac{\Delta X}{A_b} = \frac{M_o}{k_o} \quad \text{Eq. 1.2}$$

$$\frac{\Delta X}{A_b} = \frac{1}{wn_o^2} \quad \text{Eq. 1.3}$$

where ΔX is in meters, and $A_b$ is in units of m/s^2. Thus, ΔX/$A_b$=1/(2*π*150)^2=1.1 μm/m/s^2.

In various embodiments, measurements of an XY stage resulted in resonant frequencies of $F_{nx}$~55 Hz (corresponds to ~8.4 um error per m/s^2 of X frame acceleration below about 25 Hz) and $F_{ny}$~72 Hz (corresponds to ~4.8 μm error per m/s^2 of Y frame acceleration below about 35 Hz). In various embodiments, measurements of a Z stage resulted in a resonant frequency of $F_{nz}$~150 Hz, corresponds to ~1.1 um error per m/s^2 of Z frame acceleration below about 75 Hz.

In various embodiments, the servo controller includes proportional control. In various embodiments, the servo controller includes integral control. In various embodiments, the servo controller includes derivative control. In various embodiments, the servo controller includes proportional-integral-derivative (PID) control. In various embodiments, servo control parameters are tuned to reduce stage error. In various embodiments, a gain of an amplifier within the servo controller may be adjusted (increased or decreased) to adjust a resonant frequency of the servo controller. For example, to decrease stage error, the resonant frequency of the stage controller may be increased (e.g., by increasing the gain of an amplifier associated with the proportional control). In various embodiments, a servo resonance may be multiplied by a factor of $\sqrt{2}$ to thereby decrease stage error by a factor of 2. For example, increasing the servo resonance from about 55 Hz to about 77 Hz will decrease stage error from about 300 nm peak to peak to about 150 nm peak to peak.

Figure 10B:
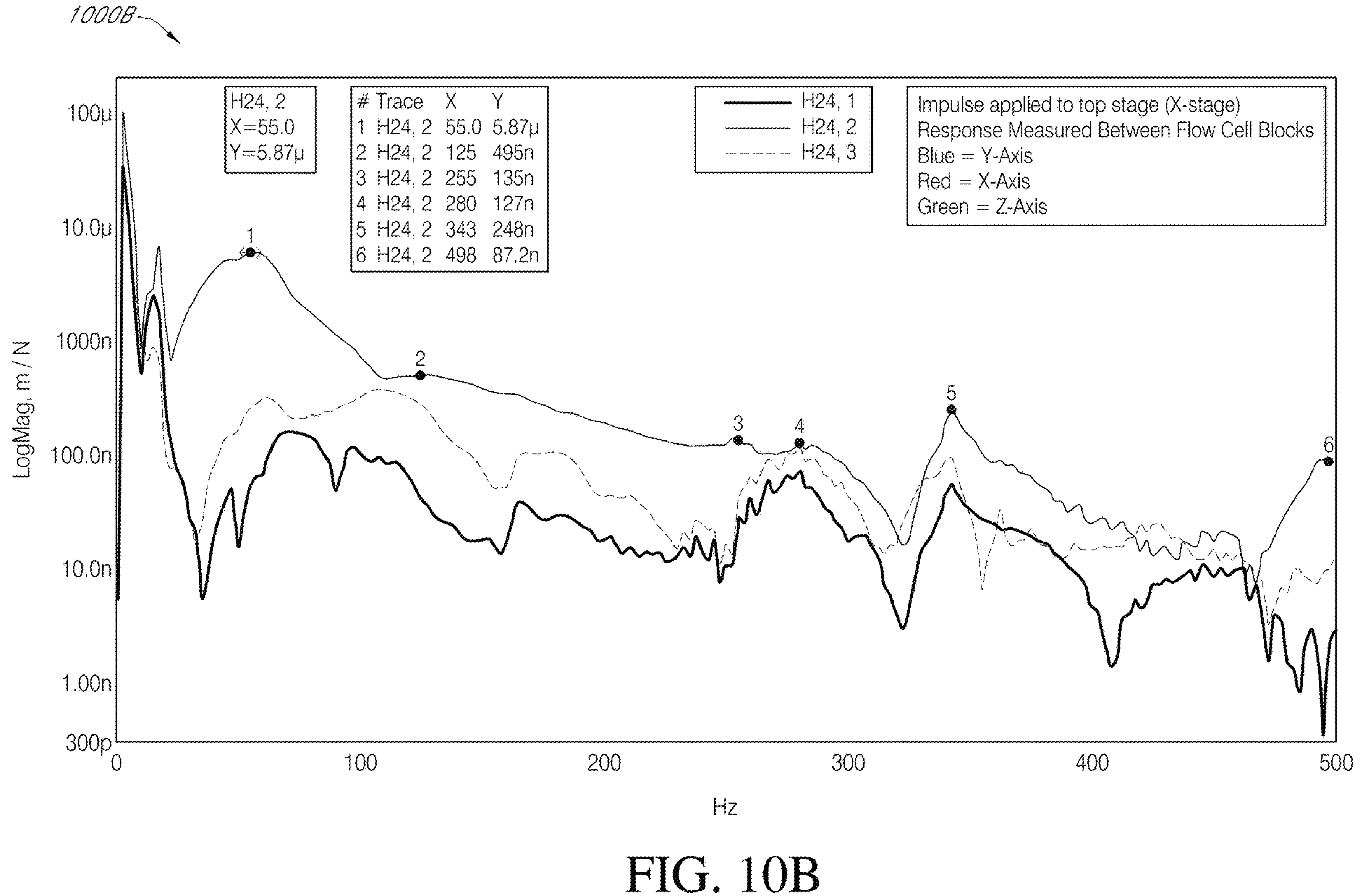
FIGS. 10B-10G illustrate various graphs of impact hammer testing of a linear stage, according to various embodiments.
Figure 10C:
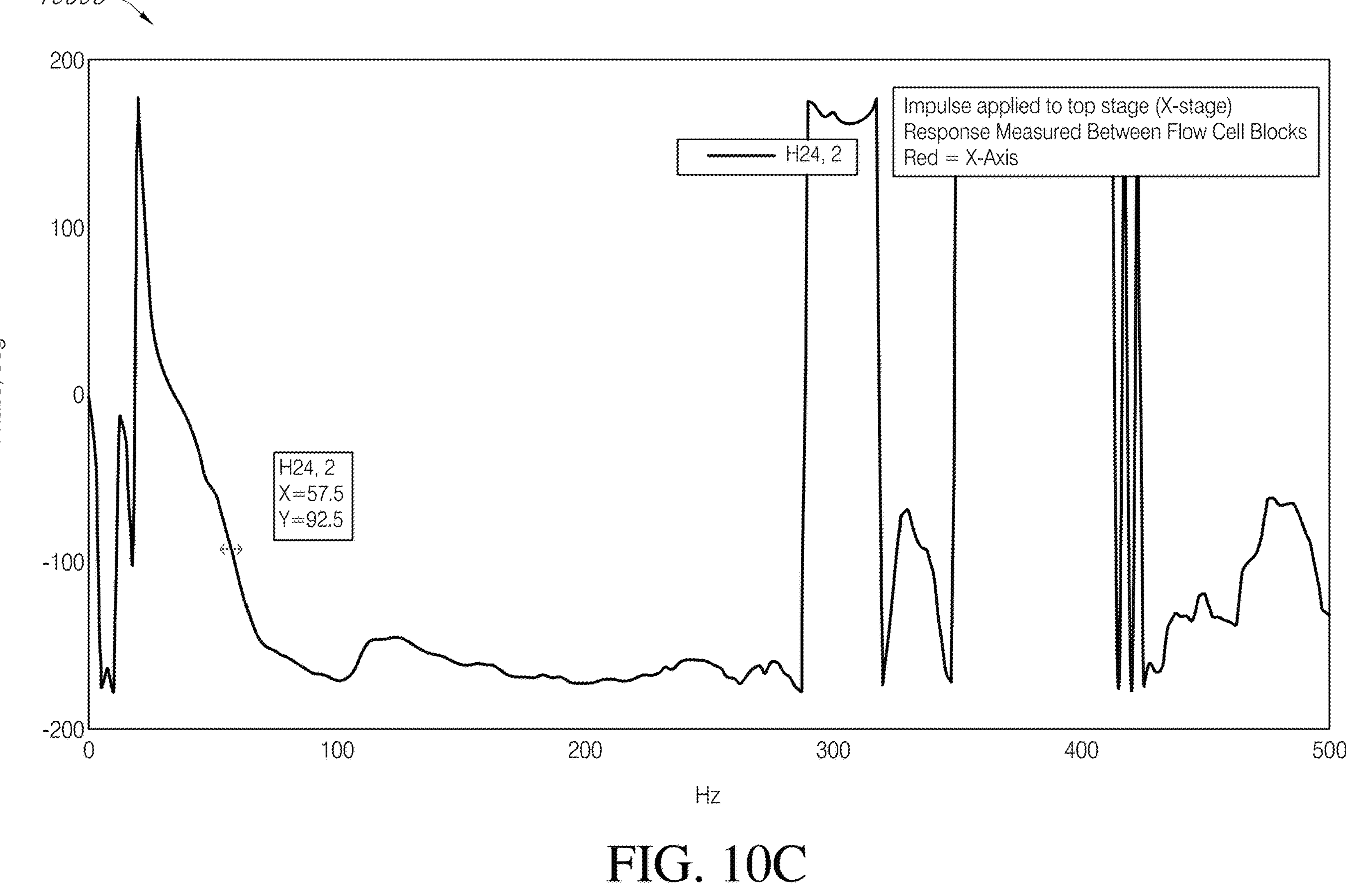
Figure 10D:
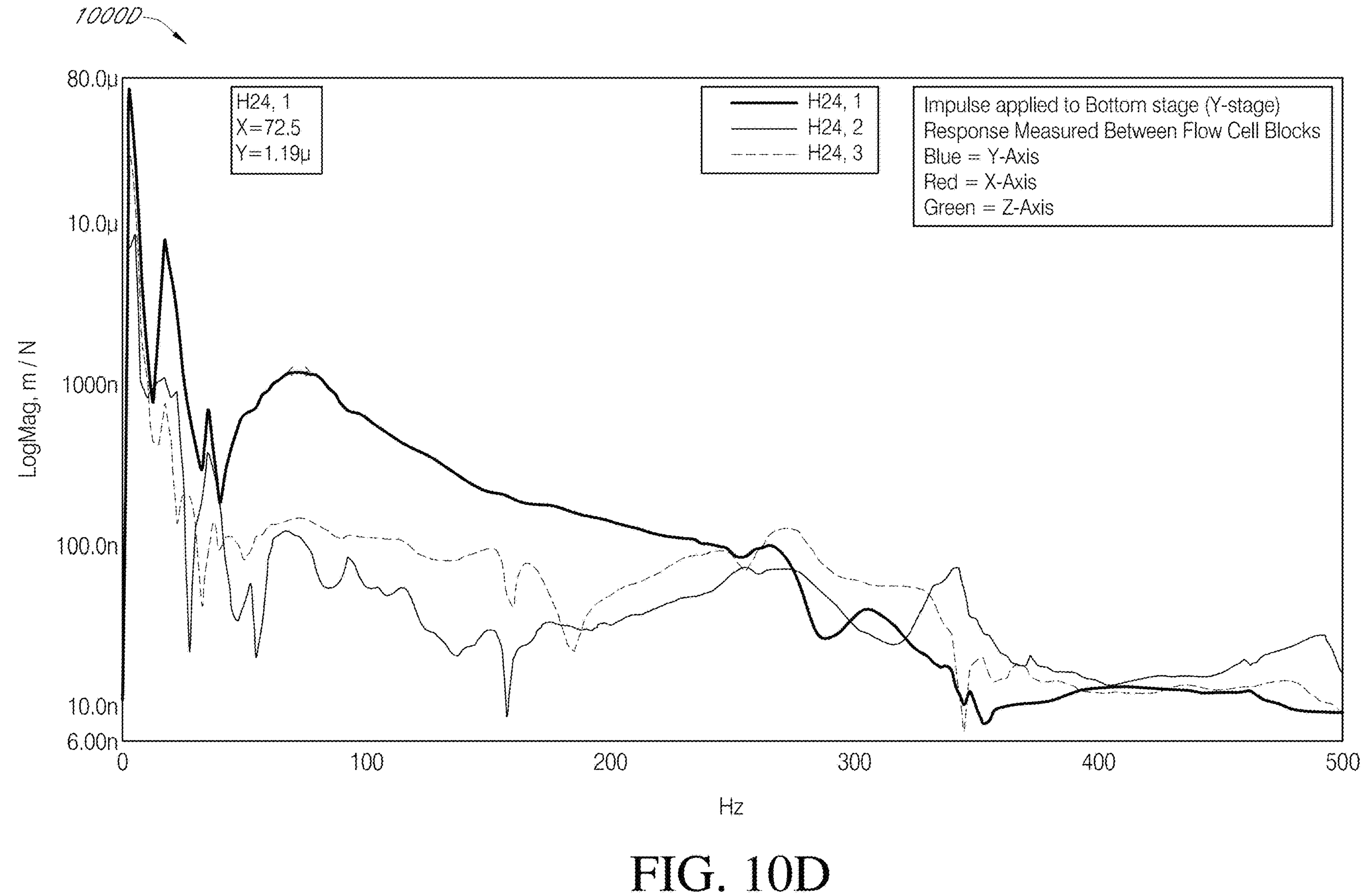
Figure 10E:
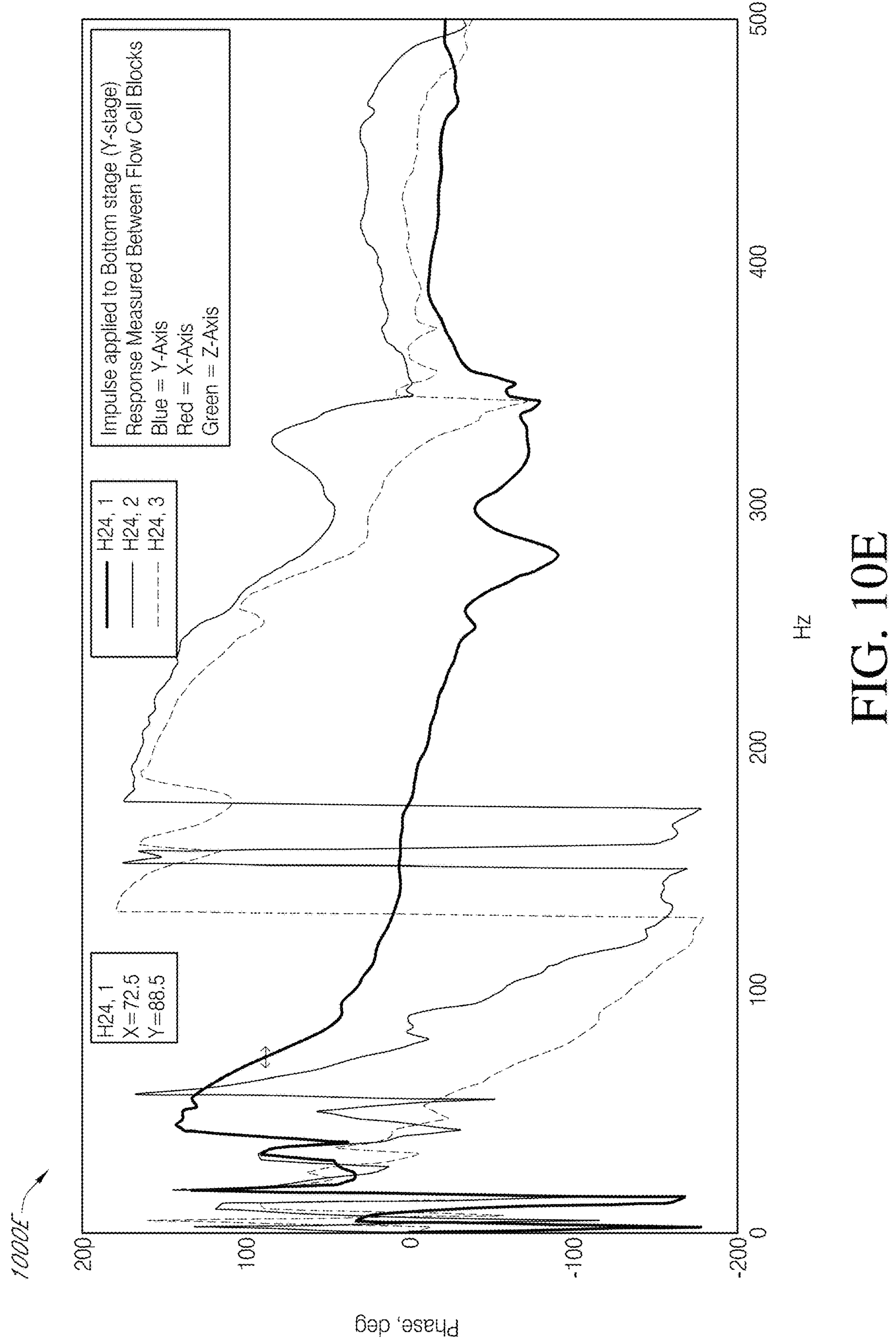
Figure 10F:
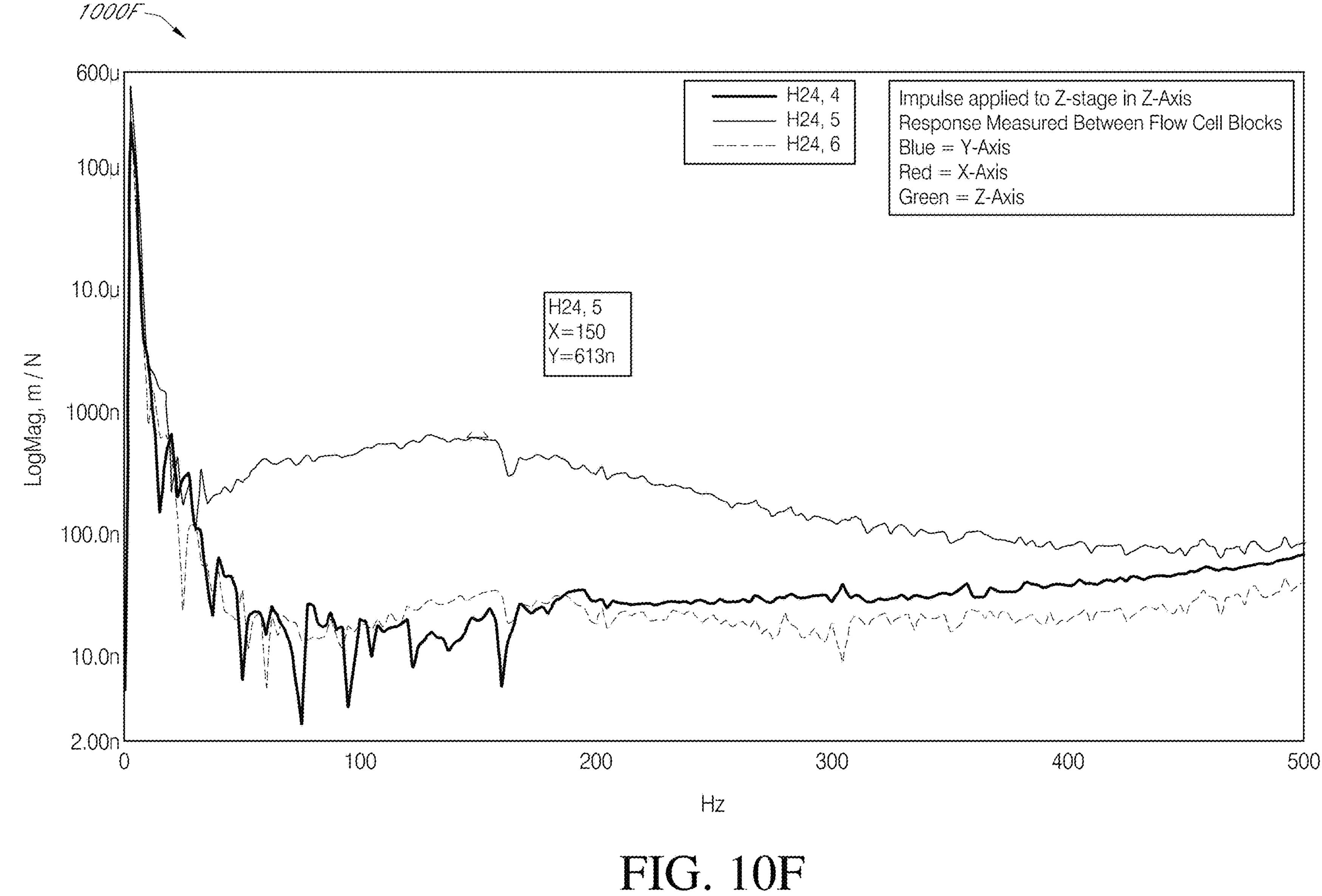
Figure 10G:
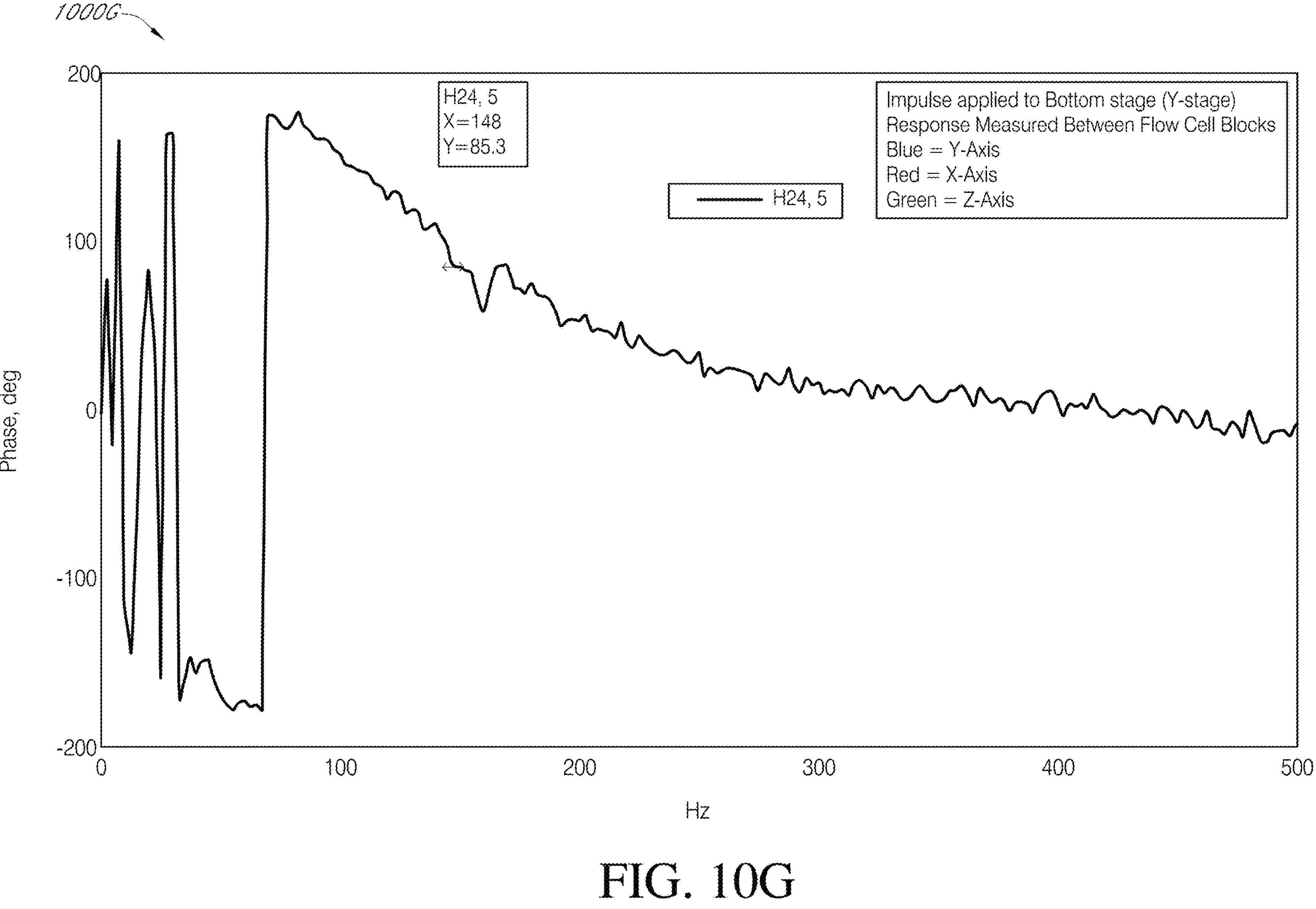

FIGS. 10B-10G illustrate various graphs of impact hammer testing of a linear stage. FIG. 10B illustrates a graph 1000B showing the resulting amplitudes of vibration in X (red), Y (blue), and Z (green) directions at a range of frequencies for the X stage. FIG. 10C illustrates a phase plot 1000C for vibrations in the X-direction of the X stage over a range of frequencies. FIG. 10D illustrates a graph 1000D showing the resulting amplitudes of vibration in X (red), Y (blue), and Z (green) directions at a range of frequencies for the Y stage. FIG. 10E illustrates a phase plot 1000E for vibrations in the Y-direction of the Y stage over a range of frequencies. FIG. 10F illustrates a graph 1000F showing the resulting amplitudes of vibration in X (red), Y (blue), and Z (green) directions at a range of frequencies for the Z stage. FIG. 10G illustrates a phase plot 1000G for vibrations in the Z-direction of the Z stage over a range of frequencies. In various embodiments, a resonant frequency is determined where the phase (between force and response) crosses 90 degrees in the phase plot.

In various embodiments, the first module includes a cooling system. Further, the second module includes an optical module containing optical components of the system. In various embodiments, the system further comprises a chassis onto which are mounted the first module and the second module, the chassis configured to couple with the vibration isolation device. In some instances, the vibration isolation device is a semi-active pneumatic vibration isolator. Additional discussion related to vibrations in the opto-fluidic instrument can be found in U.S. Provisional Application No. TBD, titled "METHODS AND SYSTEMS FOR IMPROVING SAMPLE IMAGING IN AN OPTO-FLUIDIC INSTRUMENT", which is incorporated by reference herein in its entirety.

In some cases, the optical frame may have associated therewith one or more resonance peak frequencies that lie within a resonance frequency range (RFR). Further, the optical frame can have multiple RFRs, within each of which there can be one or more resonance peak frequencies. That is, an optical frame can have associated therewith one or more RFRs, where each RFR has at least one resonance peak frequency. In some instances, the RFR may be understood to refer to a frequency range that encompasses a single resonance peak frequency, or multiple overlapping resonance peak frequencies. The lower frequency range limit and the higher frequency range limit of the RFR may be defined in terms of the peak frequency encompassed by the RFR. For example, the lower frequency range limit and the higher frequency range limit can be the frequency values closest to the peak frequency or multiple peak frequencies at which the amplitude of the curve is a pre-determined fraction of the peak frequency or one of the multiple peak frequencies. In some instances, peak finding algorithms may be used to identify RFRs, and associated peaks.

While the present teachings are described in conjunction with various embodiments, it is not intended that the present teachings be limited to such various embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

RECITATION OF EMBODIMENT

Embodiment 1: A system comprising: a cooling system configured to vibrate at one or more frequencies within a vibrational frequency range (VFR) when the system is in operation; an optics module including an optical frame having a camera, an illumination module, and an X-Y stage mounted thereon, the optical frame having a first resonance frequency within a first resonance frequency range (RFR); and a chassis onto which the cooling system and the optical frame are mounted, the chassis configured to couple to a chassis vibration isolation device (a) configured to isolate the chassis from an external environment and (b) having a second resonance frequency within a second RFR, wherein: for a first frequency range selected from (i) the first RFR, (ii) the second RFR, and (iii) the VFR, that has higher peak frequency than a second frequency range that is different from the first frequency range and is selected from (a) the first RFR, (b) the second RFR, and (c) the VFR, a lower frequency range limit of the first frequency range is greater than a higher frequency range limit of the second frequency range by at least a factor of N>2.

Embodiment 2: The system of embodiment 1, further comprising: the chassis vibration isolation device.

Embodiment 3: The system of embodiment 1 or 2, wherein the optical frame includes an optical frame vibration isolation device configured to couple the optical frame to the chassis and shift a natural resonance frequency range of the optical frame to the RFR.

Embodiment 5: The system of any of the preceding embodiments, wherein the chassis vibration isolation device is a semi-active pneumatic vibration isolator.

Embodiment 6: The system of any of the preceding embodiments, wherein the VFR ranges from about 50 to about 100 Hz.

Embodiment 7: The system of any of the preceding embodiments, wherein the first RFR ranges from about 10 Hz to about 20 Hz.

Embodiment 8: The system of any of the preceding embodiments, wherein the second RFR ranges from about 1 Hz to about 2 Hz.

Embodiment 9: The system of any of the preceding embodiments, wherein N is in the range from about 2 to about 3.

Embodiment 10: The system of any of embodiments 1-8, wherein N is in the range from about 5 to about 15.

Embodiment 11: The system of any of embodiments 1-8, wherein N is in the range from about 20 to about 40.

Embodiment 12: The system of any of the preceding embodiment, wherein the first RFR and the second RFR are such that the X-Y stage experiences a vibrational displacement amplitude that is less than a threshold displacement amplitude when the system is in operation in an international standards organization (ISO) operating theatre environment.

Embodiment 13: The system of embodiment 12, wherein the threshold displacement amplitude is about 100 nm.

Embodiment 14: A system for dampening vibrations, comprising: a first module configured to vibrate at one or more frequencies within a vibrational frequency range (VFR) when the system is in operation; a second module including a frame and a stage mounted on the frame, the frame having a first resonance frequency within a first resonance frequency range (RFR); and a vibration isolation device having a second resonance frequency within a second RFR, wherein: for a first frequency range selected from (i) the first RFR, (ii) the second RFR, and (iii) the VFR, that has higher peak frequency than a second frequency range that is different from the first frequency range and is selected from (a) the first RFR, (b) the second RFR, and (c) the VFR, a lower frequency range limit of the first frequency range is greater than a higher frequency range limit of the second frequency range by at least a factor of N>2; and the factor N is such that the stage experiences a vibrational displacement amplitude that is less than a threshold displacement amplitude when the system is in operation.

Embodiment 15: The system of embodiment 14, wherein the first module includes a cooling system.

Embodiment 16: The system of embodiment 14 or 15, wherein the second module includes an optical module containing optical components of the system.

Embodiment 17: The system of any of embodiments 14-16, further comprising a chassis onto which are mounted the first module and the second module, the chassis configured to couple with the vibration isolation device.

Embodiment 18: The system of any of embodiments 14-17, wherein the vibration isolation device is a semi-active pneumatic vibration isolator.

Embodiment 19: The system of any of embodiments 14-18, wherein the VFR ranges from about 50 to about 100 Hz.

Embodiment 20: The system of any of embodiments 14-19, wherein the first RFR ranges from about 10 Hz to about 20 Hz.

Embodiment 21: The system of any of embodiments 14-20, wherein the second RFR ranges from about 1 Hz to about 2 Hz.

Embodiment 22: The system of any of embodiments 14-21, wherein N is in the range from about 2 to about 3.

Embodiment 23: The system of any of embodiments 14-21, wherein N is in the range from about 5 to about 15.

Embodiment 24: The system of any of embodiments 14-21, wherein N is in the range from about 20 to about 40.

Embodiment 25: The system of any of embodiments 14-24, wherein the threshold displacement amplitude is about 100 nm.

What is claimed is:

1. A system comprising:

a cooling system configured to vibrate at one or more frequencies within a vibrational frequency range (VFR) when the system is in operation;

an optics module including an optical frame having a camera, an illumination module, and an X-Y stage mounted thereon, the optical frame having a first resonance frequency within a first resonance frequency range (RFR); and a chassis onto which the cooling system and the optical frame are mounted, the chassis configured to couple to a chassis vibration isolation device (a) configured to isolate the chassis from an external environment and (b) having a second resonance frequency within a second RFR, wherein:

for a first frequency range selected from (i) the first RFR, (ii) the second RFR, and (iii) the VFR, that has higher peak frequency than a second frequency range that is different from the first frequency range and is selected from (a) the first RFR, (b) the second RFR, and (c) the VFR, a lower frequency range limit of the first frequency range is greater than a higher frequency range limit of the second frequency range by at least a factor of N>2.

2. The system of claim 1, further comprising: the chassis vibration isolation device.

3. The system of claim 1, wherein the optical frame includes an optical frame vibration isolation device configured to couple the optical frame to the chassis and shift a natural resonance frequency range of the optical frame to the RFR.

4. The system of claim 1, wherein the chassis vibration isolation device is a semi-active pneumatic vibration isolator.

5. The system of claim 1, wherein the VFR ranges from about 50 to about 100 Hz.

6. The system of claim 1, wherein the first RFR ranges from about 10 Hz to about 20 Hz.

7. The system of claim 1, wherein the second RFR ranges from about 1 Hz to about 2 Hz.

8. The system of claim 1, wherein N is in the range from about 2 to about 3.

9. The system of claim 1, wherein N is in the range from about 5 to about 15.

10. The system of claim 1, wherein N is in the range from about 20 to about 40.

11. The system of claim 1, wherein the first RFR and the second RFR are such that the X-Y stage experiences a vibrational displacement amplitude that is less than a threshold displacement amplitude when the system is in operation in an international standards organization (ISO) operating theatre environment.

12. The system of claim 11, wherein the threshold displacement amplitude is about 100 nm.

13. A system for dampening vibrations, comprising:

a first module configured to vibrate at one or more frequencies within a vibrational frequency range (VFR) when the system is in operation;

a second module including a frame and a stage mounted on the frame, the frame having a first resonance frequency within a first resonance frequency range (RFR); and a vibration isolation device having a second resonance frequency within a second RFR, wherein:

for a first frequency range selected from (i) the first RFR, (ii) the second RFR, and (iii) the VFR, that has higher peak frequency than a second frequency range that is different from the first frequency range and is selected from (a) the first RFR, (b) the second RFR, and (c) the VFR, a lower frequency range limit of the first frequency range is greater than a higher frequency range limit of the second frequency range by at least a factor of N>2; and the factor N is such that the stage experiences a vibrational displacement amplitude that is less than a threshold displacement amplitude when the system is in operation.

14. The system of claim 13, wherein the first module includes a cooling system.

15. The system of claim 13, wherein the second module includes an optical module containing optical components of the system.

16. The system of claim 13, further comprising a chassis onto which are mounted the first module and the second module, the chassis configured to couple with the vibration isolation device.

17. The system of claim 13, wherein the vibration isolation device is a semi-active pneumatic vibration isolator.

18. The system of claim 13, wherein the VFR ranges from about 50 to about 100 Hz.

19. The system of claim 13, wherein the first RFR ranges from about 10 Hz to about 20 Hz.

20. The system of claim 13, wherein the second RFR ranges from about 1 Hz to about 2 Hz.

21. The system of claim 13, wherein N is in the range from about 2 to about 3.

22. The system of claim 13, wherein N is in the range from about 5 to about 15.

23. The system of claim 13, wherein N is in the range from about 20 to about 40.

24. The system of claim 13, wherein the threshold displacement amplitude is about 100 nm.

* * * * *